US010346477B1

(12) United States Patent
Zhang et al.

(10) Patent No.: US 10,346,477 B1
(45) Date of Patent: Jul. 9, 2019

(54) VORONOI-BASED EFFICIENT ALGORITHM FOR RANGE QUERY MONITORING FOR MOBILE DEVICES AND CENTRAL DATABASE SERVERS

(71) Applicants: Mingjin Zhang, Miami, FL (US); Naphtali Rishe, Miami Beach, FL (US); Jahkell Lazarre, Miami, FL (US); Jing Tong, Coral Gables, FL (US)

(72) Inventors: Mingjin Zhang, Miami, FL (US); Naphtali Rishe, Miami Beach, FL (US); Jahkell Lazarre, Miami, FL (US); Tao Li, Coral Gables, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/945,255

(22) Filed: Apr. 4, 2018

(51) Int. Cl.
  *G06F 16/901* (2019.01)
  *G06F 16/9038* (2019.01)
  *G06N 20/00* (2019.01)

(52) U.S. Cl.
  CPC ...... *G06F 16/9027* (2019.01); *G06F 16/9038* (2019.01); *G06N 20/00* (2019.01)

(58) Field of Classification Search
  CPC ......... G06F 17/30241; G06F 17/30321; G06F 17/30424
  USPC ................ 707/737, 743, 758, 797, E17.018, 707/E17.087, E17.089, 999.003, E17.009, 707/E17.014, E17.023, E17.055, E17.109, 707/741, 748, 763, 769, 776, 780, 791, 707/999.002, 999.2; 701/533, 411, 412, 701/423, 409, 410, 414, 426, 438, 450, 701/461, 468, 529, 532, 540
  See application file for complete search history.

(56) References Cited

U.S. PATENT DOCUMENTS 10,095,724 B1 * 10/2018 Zhang ................. G06F 16/2458

OTHER PUBLICATIONS

Cheema et al. ("Multi-Guarded Safe Zone: An Effective Technique to Monitor Moving Circular Range Queries" ;Data Enginering (ICDE), 2010 IEEE 26h International Conference; Date added to IEEE Xplore: Apr. 15, 2010).*
Sharifzadeh et al. ("Processing Spatial Skyline Queries in Both Vector Spaces and Spatial Network Database"; ACM Transactions on Database Systems, vol. 34, No. 3, Article 14, Publication date: Aug. 2009).*

(Continued)

*Primary Examiner* — Jay A Morrison
*Assistant Examiner* — Ken Hoang
(74) *Attorney, Agent, or Firm* — Saliwanchik, Lloyd & Eisenschenk

(57) ABSTRACT

Systems and methods for performing a mobile range query are provided. A system can include a first computer readable medium configured to iteratively transmit a mobile range query, as well as a second computer readable medium configured to: receive a mobile range query; compute a range query result; build two min-heaps that contain in-border interest points and out-border intersect points respectively; construct an initial candidate safe region by popping top elements in the two min-heaps while they are not empty; computing the intersections of the domain region of the top elements and the candidate safe region and redefining the candidate safe region using the intersections; and return the mobile range query results to the first medium.

18 Claims, 24 Drawing Sheets

(56) References Cited

OTHER PUBLICATIONS

Safar et al. ("Voronoi-based reverse nearest neighbor query processing on spatial networks", Mutilmedia Systems (2009); 15:295-308 DOI 10.1007/s00530-009-0167-z).*

Xuan et al. ("Voronoi-based range and continuous range query processing in mobile databases", Journal of Computer System Science 77 (2011) 637-651). (Year: 2011).*

* cited by examiner

10,346,477 B1

VORONOI-BASED EFFICIENT ALGORITHM FOR RANGE QUERY MONITORING FOR MOBILE DEVICES AND CENTRAL DATABASE SERVERS

STATEMENT OF GOVERNMENT SUPPORT

This invention was made with government support under Grant No. IIS-1213026 awarded by the National Science Foundation. The government has certain rights in the invention.

BACKGROUND

The rising popularity of location-based services (LBS) is attributed to the high availability of inexpensive Global Position Systems (GPS), network bandwidth, and mobile devices with expanded storage and increased processing power. Mobile clients frequently use LBS applications to perform spatial queries based on their current locations. A popular type of spatial query is a range query.

A range query returns a collection of points of interest within a specified query range comprising a geographic circle. The query is sent to a server to process the query, and the server returns the result to the client via wireless networks. When the client's position changes, the result may be immediately invalidated and the client must continuously repost the query to the server to compute and retrieve updated results, incurring high network usage and processing costs.

Mobile Range Query (MRQ), also known as Moving Range Query, is defined as the retrieval of a range query result along with a safe region, also known as a safe zone or a validity region. As long as the user stays within the safe region, the current query result will remain unchanged; thereby the mobile client does not need to post another query.

BRIEF SUMMARY

Embodiments of the subject invention providing systems and methods for retrieving a range query result with a corresponding safe region, which is an area in which the query result remains the same with respect to a set of points of interest, as seen in FIG. 4. To efficiently process mobile request queries (MRQs), embodiments of the subject invention can utilize Voronoi diagram based data structures. A Voronoi diagram is the partitioning of a plane of points into Voronoi polygons, which are convex polygons that each comprise one generating or seed point (see, for example, FIG. 5). A Voronoi R-Tree (VoR-tree), which is an index structure that incorporates Voronoi diagrams into R-trees, can be used to segment portions of the mobile request query. Embodiments of the subject invention can compute a range query result and insert interest points into an In-Border-Heap and an Out-Border-Heap. The computation of the range query result and building of the foregoing heaps can be done using, for example, one of two algorithms of embodiments of the subject invention: (a) a modified R-tree range query on the VoR-tree; or (b) a modified Voronoi dynamic k-nearest neighbor (k-NN) algorithm. Additionally, certain embodiments of the subject invention can return interest points to a user as an alternative approach to returning safe regions.

DETAILED DESCRIPTION

Figure 4:
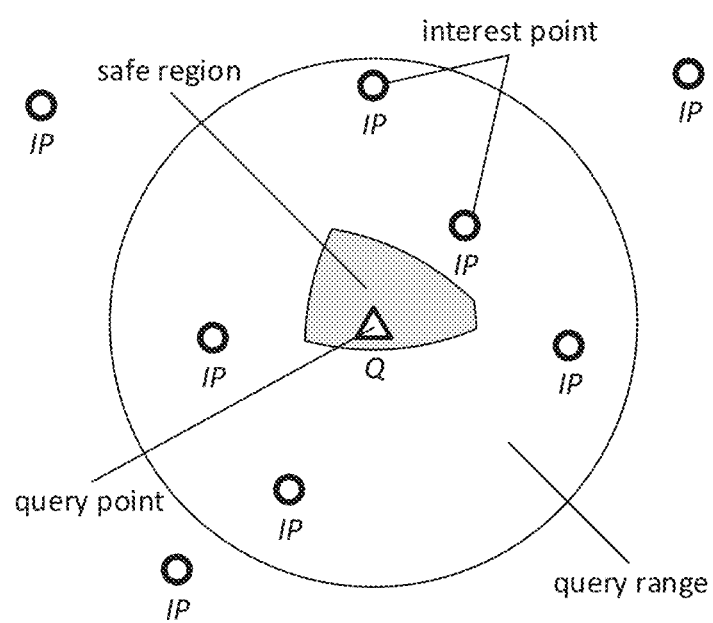
FIG. 4 shows a diagram of a query point within a safe region within a query range in a Mobile Range Query.

Embodiments of the subject invention provide systems and method for retrieving a range query result with a corresponding safe region, which is an area in which the query result remains the same with respect to a set of points of interest, as seen in FIG. 4. To efficiently process mobile request queries (MRQs), embodiments of the subject invention can utilizes a Voronoi diagram. A Voronoi diagram is the partitioning of a plane of points into Voronoi polygons, which are convex polygons that each comprises one generating or seed point (see, for example, FIG. 5). A Voronoi R-Tree (VoR-tree), which is an index structure that incorporates Voronoi diagrams into R-trees, can be used to segment portions of the mobile request query. Two minheaps of interest points (IPs), an In-Border-Heap and an Out-Border-Heap, can be utilized to store interest points within and outside the border of a range query, respectively. Interest points in the heaps are ordered by their distance to the query range circle. An In-Border-Heap can contain in-border points, which are interest points that are within a query range (also referred to as a covered point), that have at least one adjacent point not within the query range, i.e., an uncovered point, as an adjacent generator. The adjacent generators or neighbors of a point are the generating points or seeds of the point's adjacent Voronoi polygons. An Out-Border-Heap can contain out-border points, which are out-border point is an uncovered point that is a neighbor of an in-border point.

Embodiments of the subject invention can compute a range query result and initially build an In-Order-Heap and an Out-Border-Heap. The computation of the range query result and building of the foregoing heaps can be done using one of two algorithms according to embodiments of the subject invention: (a) a modified R-tree range query on the VoR-tree; or (b) a modified Voronoi dynamic k-nearest neighbor (k-NN) algorithm. When utilizing the k-NN algorithm, the R-tree in the VoR-tree is only used to compute the 1-NN. The modified R-tree range query algorithm traverses the R-tree in the VoR-tree to compute the range query result. For both algorithms, interest points that are encountered can be classified as in-border or out-border and inserted into the In-Border-Heap or the Out-Border-Heap. After the interest points are inserted into the heaps, an initial candidate safe region can be computed. A candidate safe region is potentially the safe region, i.e. the actual safe region is at most the area of the candidate safe region.

The In-Border-Heaps and Out-Border-Heaps can be utilized to more efficiently process the MRQ using a combination of optimization heuristics; however, any data structure or combination of data structures can be used to store the in/out-border points and/or relevant metadata. Embodiments of the subject invention can utilize a multitude of optimization heuristics to more efficiently process MRQs. Other heuristics not defined by the subject application can be substituted for the herein described heuristics or add to the herein defined heuristics can be valid for achieving the same goal of efficiently processing MRQs.

Figure 3:
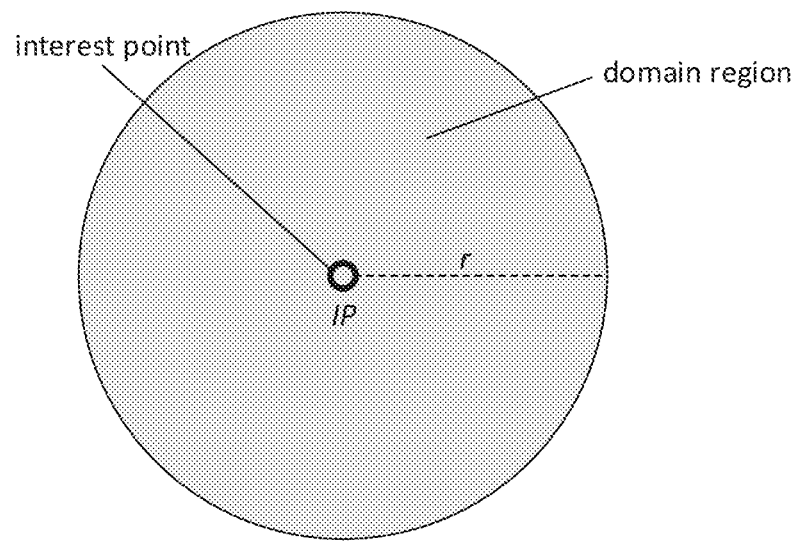
FIG. 3 shows a diagram of a domain region of an interest point.

Potential heuristics that can be utilized in order to determine the order of steps in which the safe region is constructed and incrementally refined include the following: Heuristic 1: The initial candidate safe region is the domain region of the in-border point closest to the query range circle (i.e., the top of In-Border-Heap). The domain region of an interest point, as depicted in FIG. 3, is defined as a circle centered at the foregoing interest point with a radius equal to that of the query range. Heuristic 2: The method continues refining (i.e., removing excess area from, the candidate safe region until both of the foregoing heaps are empty). Refinement can be done by retrieving the next in/out-border point closest to the query range circle (i.e., popping the appropriate heap, and computing the domain region of the retrieved point and the intersection between the domain region and the candidate safe region). If the retrieved point is an in-border point, the candidate safe region is re-defined as the foregoing intersection. Otherwise, if the retrieved point is an out-border point, the candidate safe region can be re-defined as the foregoing intersection subtracted from the candidate safe region.

Certain embodiments of the subject invention can output a result when no interest points are part of the query result. In this case, the safe region can be the union of the domain regions of all uncovered interest points subtracted from the area of the universe. If the area of the universe is infinite, then the area of this special safe region is also infinite. Otherwise, the area of the special safe region is finite. Embodiments of the subject invention can construct a conservative safe region. This conservative safe region can be a circle centered at the query point whose radius is equal to the distance between the query point and closest interest point subtracted by the radius of the query range. When the conservative safe region is returned to the user, the range query result will not change as long as the user (or query point or moving object) stays within the conservative safe region. In the case of the conservative safe region, when the user exits the region, the user will need to repost the query, even though the results may still stay the same. This is because the conservative safe region underestimates the area of the actual safe region.

Embodiments of the subject invention can return interest points to a user as an alternative approach to returning safe regions. Interest points that contribute to the construction or refinement of the safe region have two categories: inner and outer. An inner interest point resides within the query range while an outer interest point resides outside the query range. A set of interest points and their categories can be returned to a user. The user's device can check a change in any of the statuses of interest points while the query point is moving (e.g., an inner influential object becomes an out of the query range, or vice versa). If a change in status occurs, the query results are invalidated and another query is required to be posted to server. However, if the statuses of the objects stay the same, the query result will not change.

Additionally, the embodiments of the subject invention can return with the result set and the safe region, interest points, or other data that may be derived from the result set. For example, location-based services can provide advertisements and recommendations along with the results. A modified result set with an internally applied filter or a result set that does not consist of interest points, but other data that is of relevance, can be returned to the user. As illustrated in the figures, embodiments of the subject invention provide methods for MRQ resolution that can outputs a safe region, in which the results of a range query will not change. Given a query point q, a set of interest points IP, a range r, a two-component tuple comprising the range query result and a safe region can returned as a result.

A query point q can be a tuple of coordinates and can represent an object in physical or virtual multidimensional space, for example: a person, an animal, a car, a plane, a smartphone, or a drone. Each interest point IP, can represent an object of same or different type than that of other interest point IP. Every interest point IP is a stationary object, for example: a gas station, police station, restaurant, hotel, or an objective in a videogame. The query range can be centered at query point q. Range r is equivalent to the radius of query range.

Embodiments of subject invention can generate a result R, which can be a two-component tuple comprising the range query result and a safe region. The range query result can consist of a subset of IPs that is within the query range. The safe region can possibly be represented in a multitude of ways. For example, the safe region can be a list of interest points and/or their contributing arcs (pairs of points) to the safe region.

Figure 5:
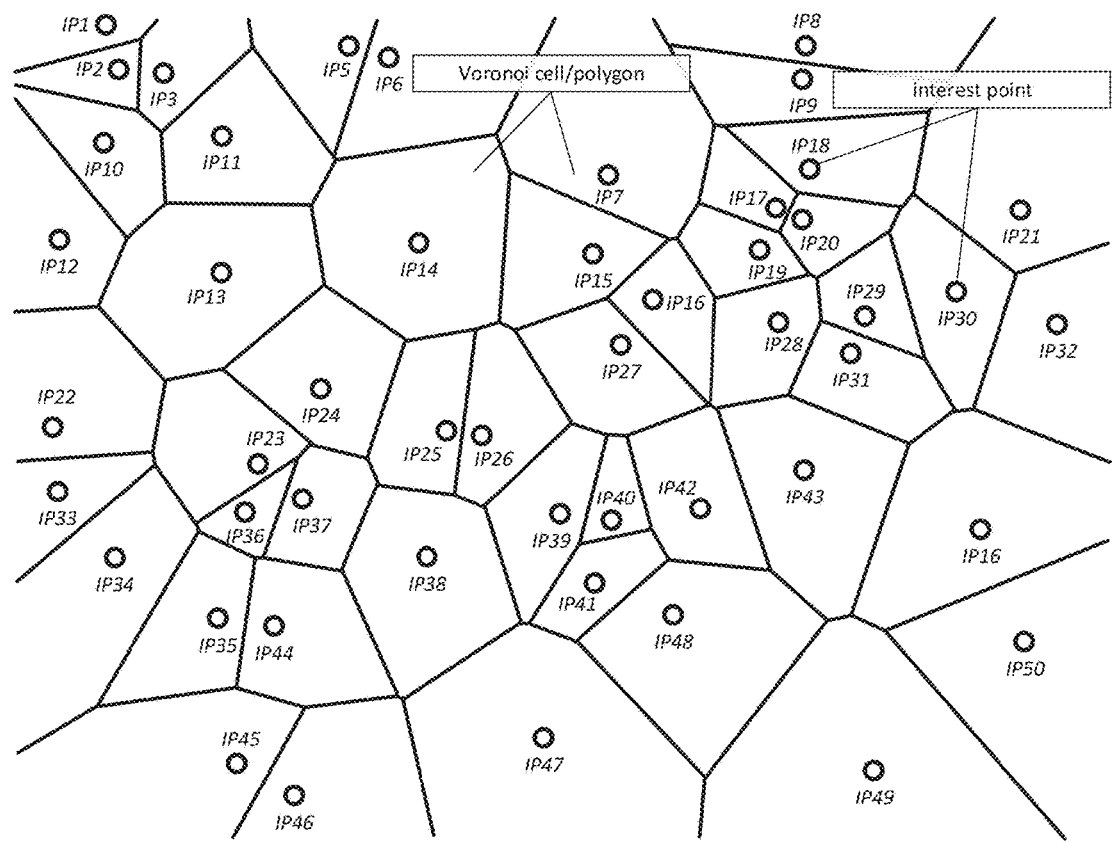
FIG. 5 shows a diagram depicting interest points bounded by Voronoi polygons in a Voronoi diagram.

A first workflow step can be to bind a set of interest points using a Voronoi diagram. A VoR-tree can be constructed on a spatial database (set of interest points) before the execution of the algorithm. For example, as seen in FIG. 5, the interest points $IP_1$-$IP_{50}$ are "bound" using a Voronoi diagram.

A second workflow step can be to compute the range query result and build an In-Border-Heap and an Out-Border-Heap. Two possible ways in which can be implemented are a modified R-tree range query on the VoR-tree or a modified Voronoi dynamic k nearest neighbor (k-NN) algorithm.

A modified R-tree range query on the VoR-tree can be utilized to compute a range query result and build heaps by traversing the VoR-tree. A root node from VoR-tree can be retrieved. If the node is fully covered by the query range, all of the leaf nodes in the subtree rooted at that node can be included in the range query result. The foregoing leaf nodes that are in-border points, (i.e., one of their adjacent generators are not in the query range), can be inserted into the In-Border-Heap. The adjacent generators of the foregoing leaf nodes that are not covered by the query range can be inserted into Out-Border-Heap. If a node is partially covered by the query range, the node can be expanded, and this process of building heaps by traversing the VoR-tree can be performed on the node's children.

Leaf nodes must be either fully covered or not covered by the query range as they are interest points. In other words, leaf nodes cannot be partially covered by the query range. If a node is not covered by the query range, the subtree rooted at that node is not traversed.

A special case can occur if no covered points were found, meaning the range query result set is empty. A conservative safe region can be constructed by computing the query point's 1-NN (the closest interest point to the query point). This can possibly be done in multiple ways. A VoR-tree algorithm can be used to retrieve the 1-NN, for example. Once the 1-NN is retrieved, the conservative safe region can be defined as a circle centered at the query point with a radius that is equal to the distance between the query point and the 1-NN subtracted by the radius of the query range. At this point, since the conservative safe region has been constructed, the MRQ is finished, returning as a result a two-tuple can comprise an empty range query result set and the computed conservative safe region. After building the heaps a range query result can be computed and returned.

A second method to compute a range query result and build In-Border-Heap and an Out-Border-Heap can be to utilize a Modified Voronoi dynamic k nearest neighbor (k-NN) algorithm. The following Voronoi k-NN procedure can be utilized to reach this result. A first step can be to compute and enqueue 1-NN.

The 1-NN can computed using a VoR-tree algorithm. If the 1-NN is covered by the query range, the 1-NN can be inserted into a queue of interest point entries. A queue can be a data structure for which the primary operations are "enqueue," (i.e., insert elements at the back), and "dequeue" (i.e., remove elements from the front).

If the 1-NN is not covered by the query range, a conservative safe region can computed. The MRQ ends and a two-tuple comprising an empty range query result set and the computed conservative safe region can be returned.

A second step can be to build heaps while the queue is not empty. The queue can be dequeued. If the interest point is within the query range, the interest point can be included in the range query result and the interest point's adjacent generators can be enqueued. Furthermore, if the interest point is an In-Border point, the interest point can be inserted into the In-Border-Heap. Otherwise, if the interest point is not within the query range, the interest point can be inserted into the Out-Border-Heap. These steps can be repeated until the queue is empty. After the queue is empty a range query result can be returned.

A third work flow step can be to construct an initial candidate safe region. In order to construct initial candidate safe region the following steps can be taken. A first step can be to pop the In-Border-Heap. A second step can be to compute the domain region of the retrieved interest point using the query range as a radius. A third step can be to initialize the initial candidate safe region with the foregoing domain region.

A fourth workflow step can be to refine candidate safe region while either the In-Border-Heap or the Out-Border-Heap is not empty. If the distance between top interest point of the In-Border-Heap and the query range circle is equal to or less than that of the distance of the top interest point of Out-Border-Heap and the query range circle, the In-Border-Heap can be popped. The domain region for the retrieved interest point can be computed. Next, a determination can be made of whether there is an intersection between the domain region and the candidate safe region. If there is an intersection, the intersection can be computed as the new refined candidate safe region. Otherwise, if the distance between the top interest point of the In-Border-Heap and the query range circle is greater than that of the distance of the top interest point of the Out-Border-Heap and the query range circle, the Out-Border-Heap can be popped. The domain region for the retrieved interest point can be computed. A determination can be made of whether there is an intersection between the domain region and the candidate safe region. If there is an intersection, the intersection can be computed. The candidate safe region can be redefined by removing the intersection from the initial candidate safe region. These sets can be repeated until both the In-Border-Heap and the Out-Border-Heap are empty.

Determining the existence of an intersection of between a domain region of each interest point, which is simply a circle, and the candidate safe region can be computationally prohibitive due to the candidate safe region's complex shape. As such, to potentially minimize the number of computations needed to check for an intersection, an optional optimization can be performed. A bounding circle, (i.e., a circle centered at the query point whose radius is equal to the distance between the query point and the farthest point on the candidate safe region) can be constructed. In order to determine if a domain region intersects a candidate safe region, the domain region can be checked to see if the domain region intersects the bounding circle. If the domain region does not intersect the bounding circle, then the domain region must not intersect the candidate safe region as the bounding circle encloses the candidate safe region. This eliminates the need to determine the intersection between the domain region and the candidate safe region. Otherwise, if the domain region intersects the bounding circle, then a more computation-intensive task of determining the existence of an intersection between the domain region and the complex shape of the candidate safe region can be performed.

In certain embodiments of the subject invention, computing the intersection between a domain region and the candidate safe region can be to store a list of interest points, also referred to as guard objects, along with their contributing arcs to the candidate (or final) safe region in memory to not only refine the candidate safe region, but to also define the candidate (or final) safe region.

A fifth workflow step can be to return the MRQ result. The result can include the computed range query result and the computed final safe region or the guard objects, alternatively. The result can be in the form of a two-tuple comprising the range query result and the computed final safe region or the guard objects, alternatively.

Figure 1:
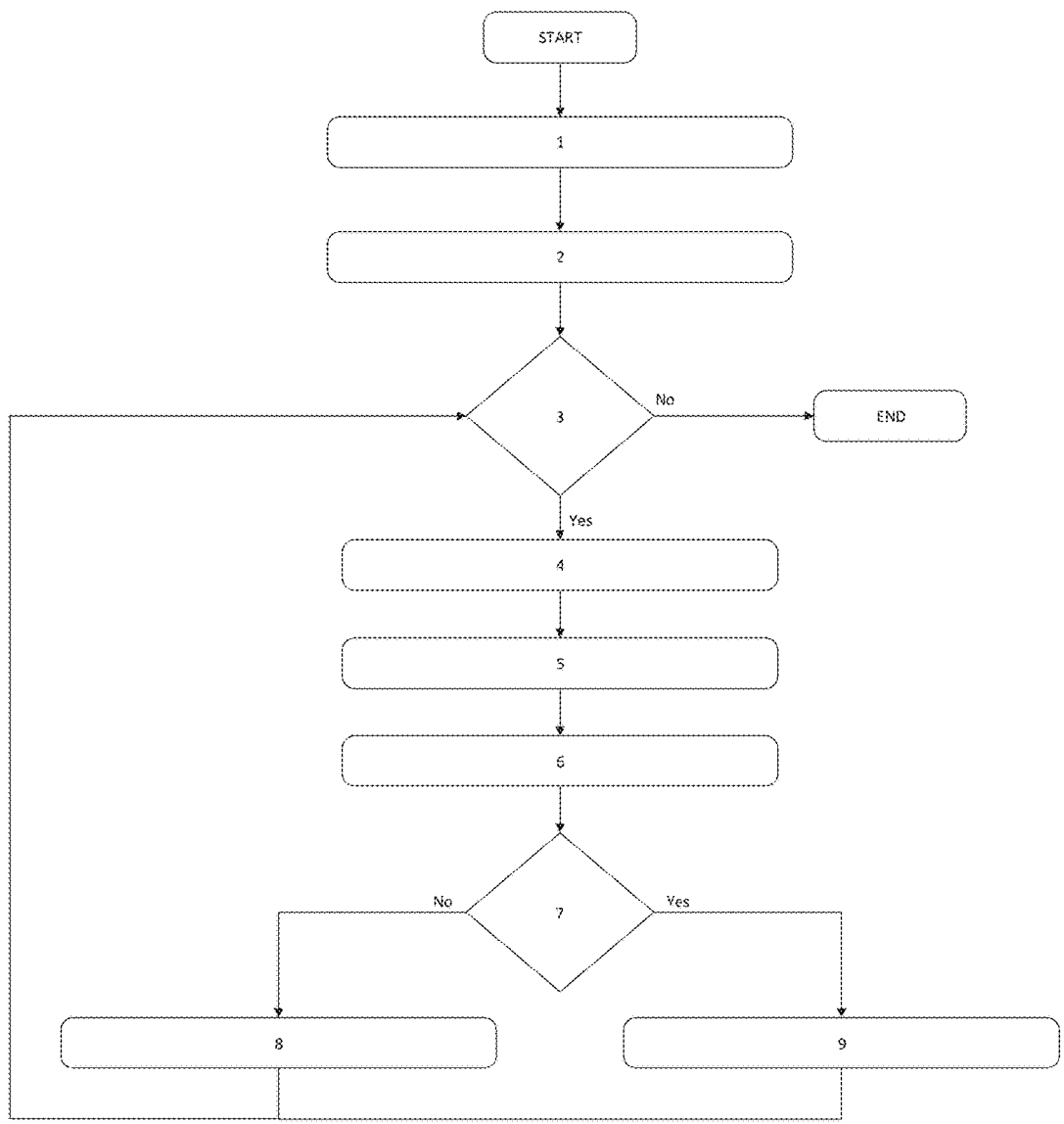
FIG. 1 shows a diagram of a possible workflow of a Mobile Range Query (MRQ) according to an embodiment of the subject invention.

A Voronoi based MRQ flowchart can be seen in FIG. 1, according to certain embodiments of the subject invention. A first step in the process flow can be to compute a range query result and build an In-Border-Heap and an Out-Border-Heap. If the previously described special case is reached, (i.e., the range query result is empty), a conservative region can be constructed and the MRQ ended. A second step can be to construct an initial candidate safe region by popping the In-Border-Heap and compute the domain region of the retrieved interest point using the query range as a radius. A third step can be to determine whether either the In-Border-Heap or Out-Border-Heap not empty. If the In-Border-Heap and the Out-Border-Heap are empty the process can be ended. A fourth step can be to pop the heap whose interest point at the top of the heap has the least distance to the query range circle. A fifth step can be to compute the domain region for the retrieved interest point. A sixth step can be to compute the intersection between the candidate safe region and the domain region. A seventh step can be to determine whether the retrieved point is an in-border point. If the retrieved point is not an in-border point, an eight step can be to refine the candidate safe region by re-defining it as the intersection subtracted from the candidate safe region. If the retrieved point an in-border point, an ninth step can be to refine the candidate safe region by re-defining it as the intersection. Whether the retrieved point is an in-border point or not, after refining the candidate safe region, the process flow can be directed back to the third step of determining whether the In-Border-Heap or Out-Border-Heap are empty.

Figure 6A:
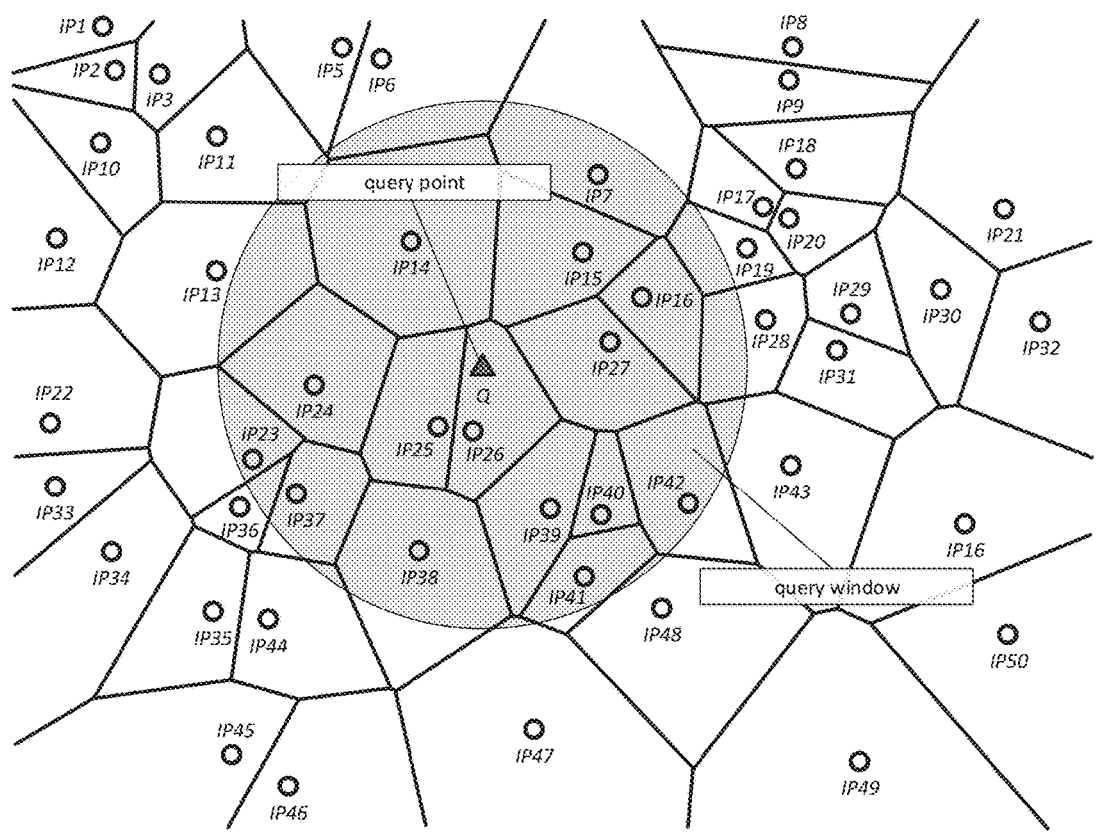
FIGS. 6A-6T show diagrams illustrating the workflow of constructing and refining a safe region in a Mobile Range Query.
Figure 6B:
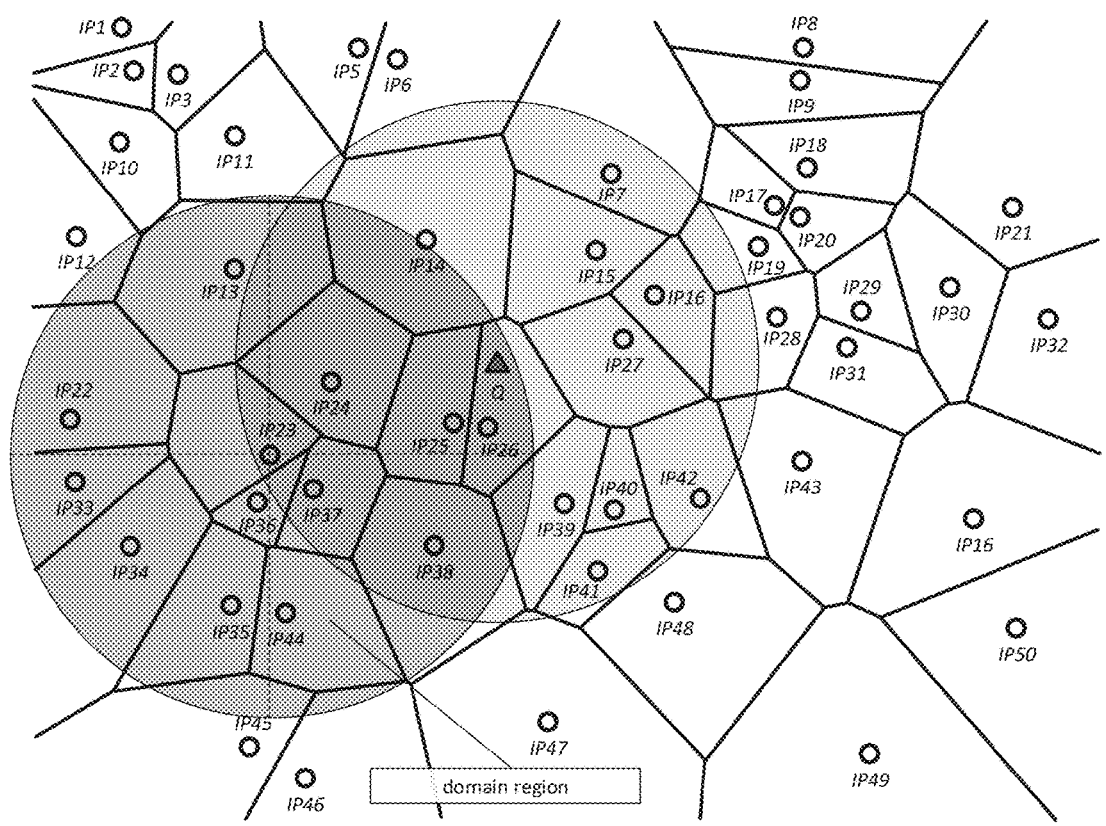
Figure 6C:
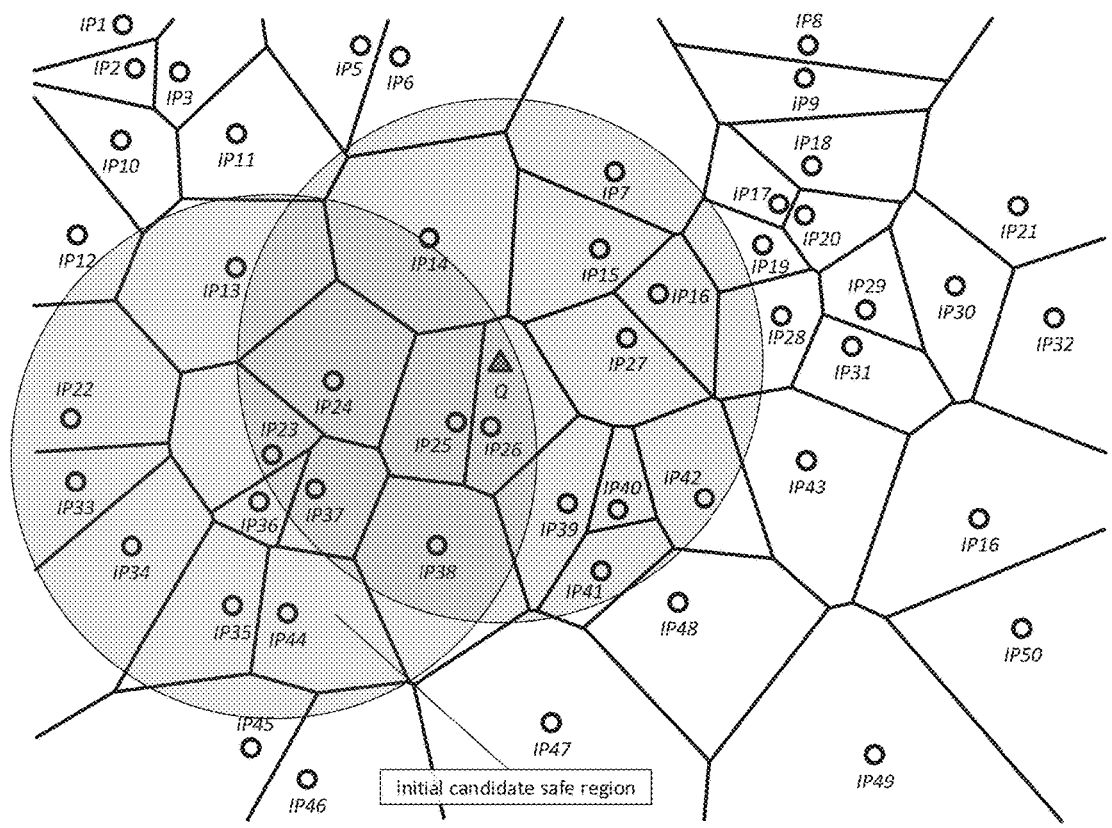
Figure 6D:
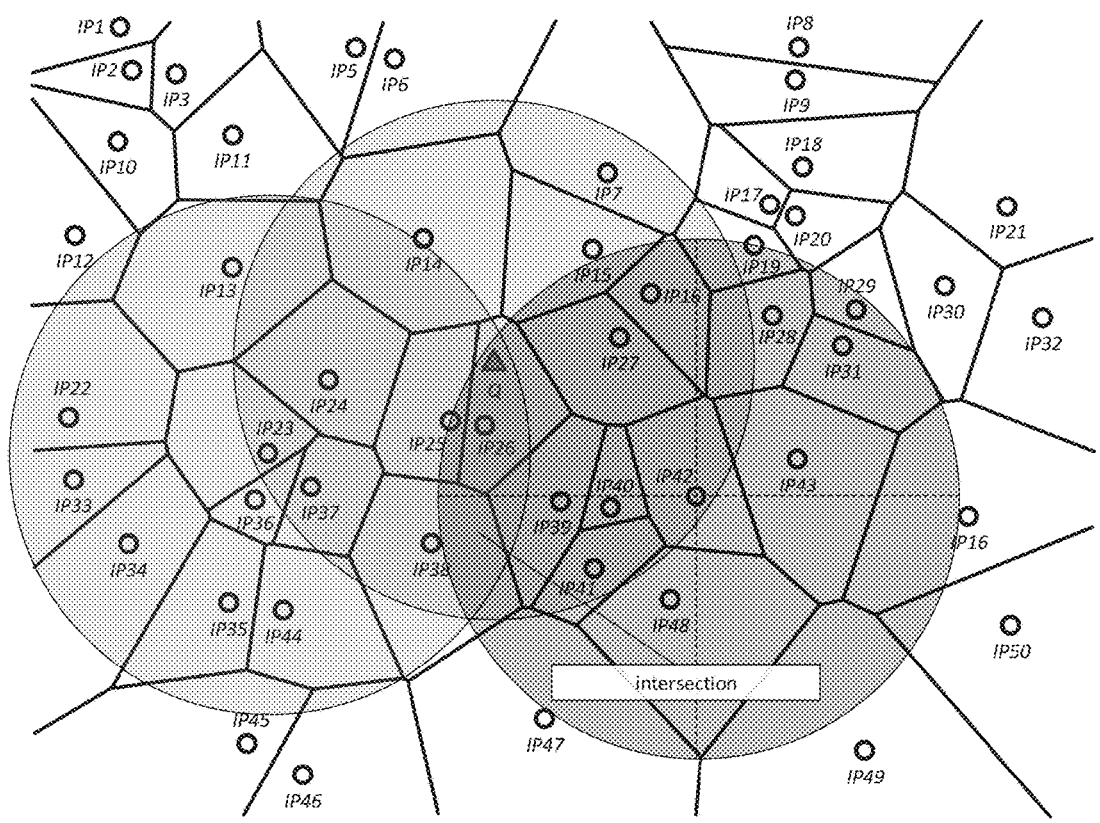
Figure 6E:
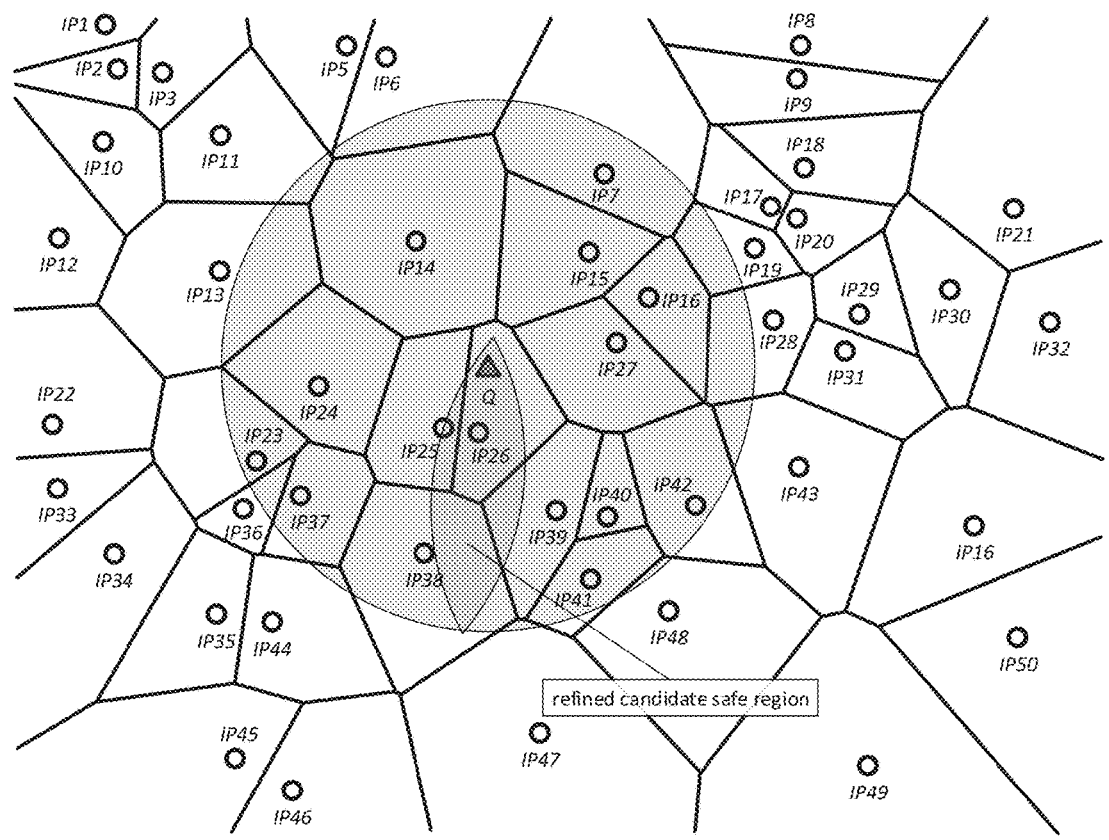
Figure 6F:
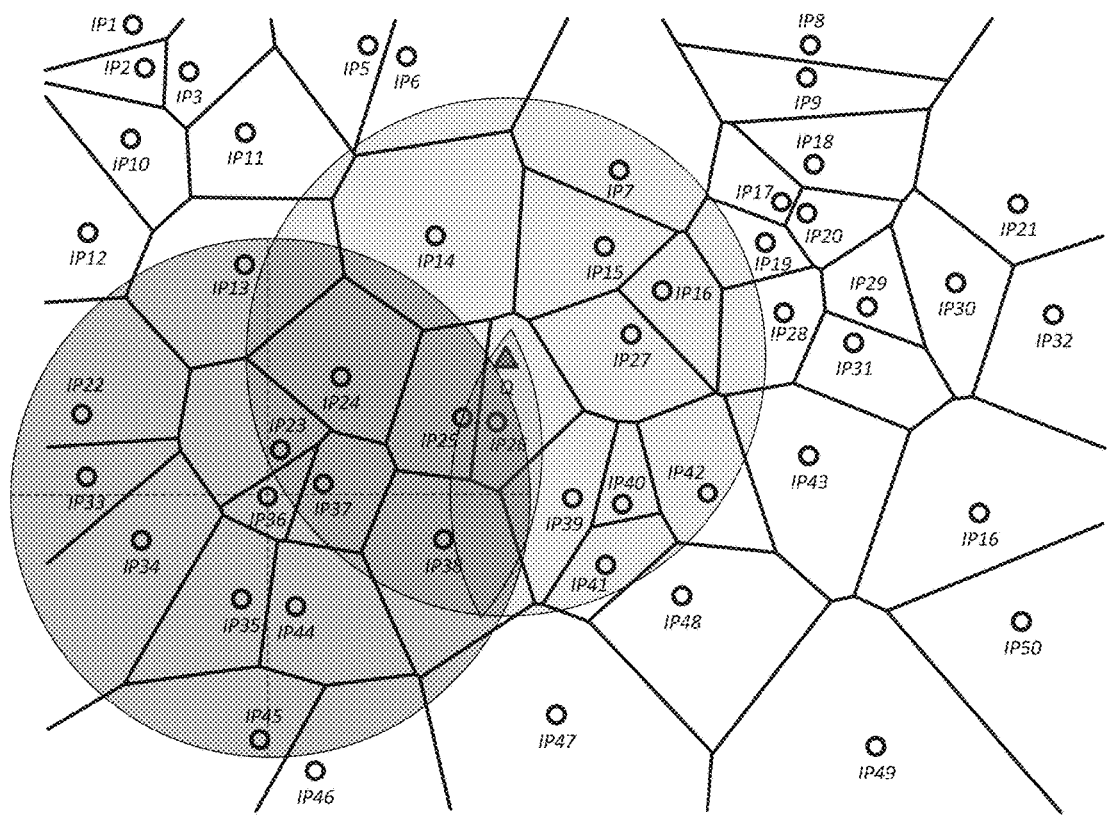
Figure 6G:
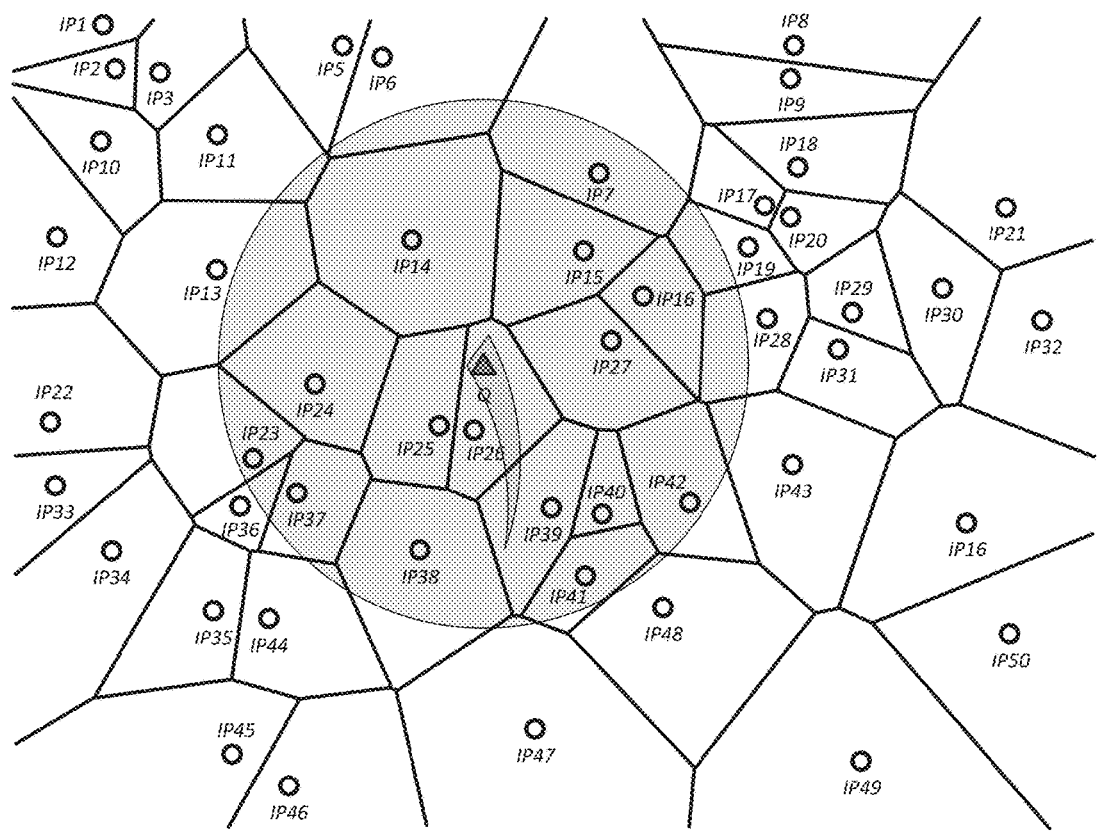
Figure 6H:
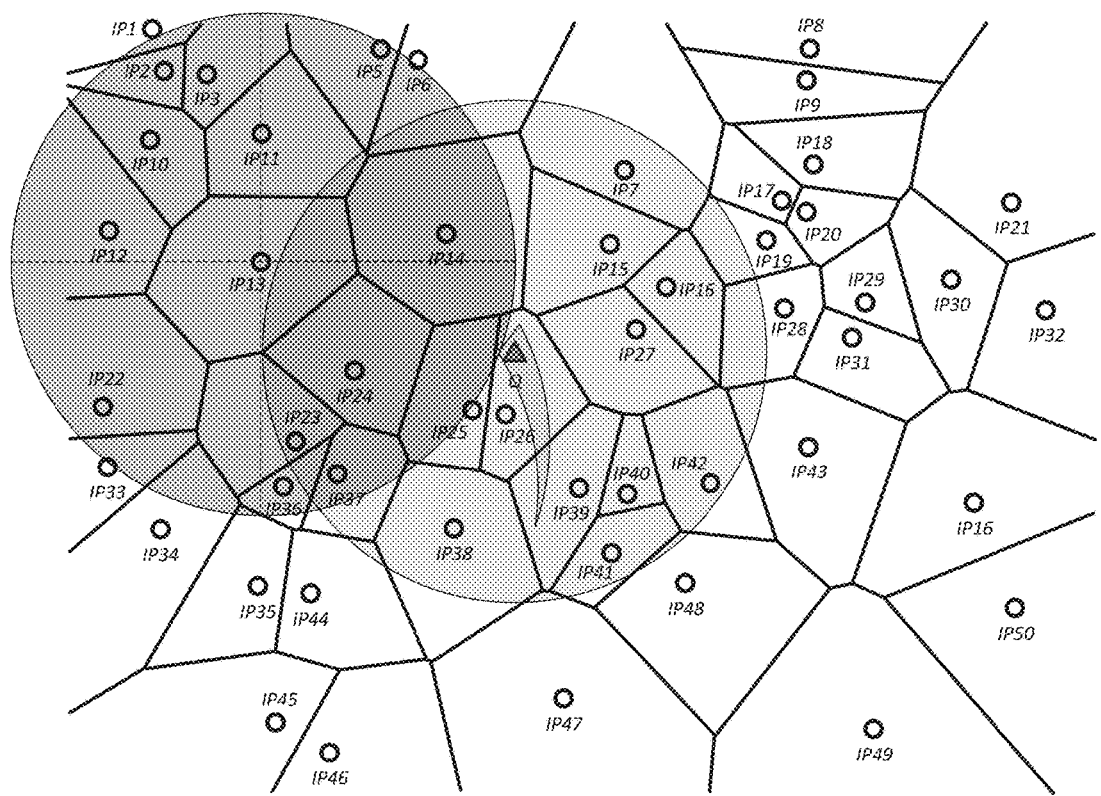
Figure 6I:
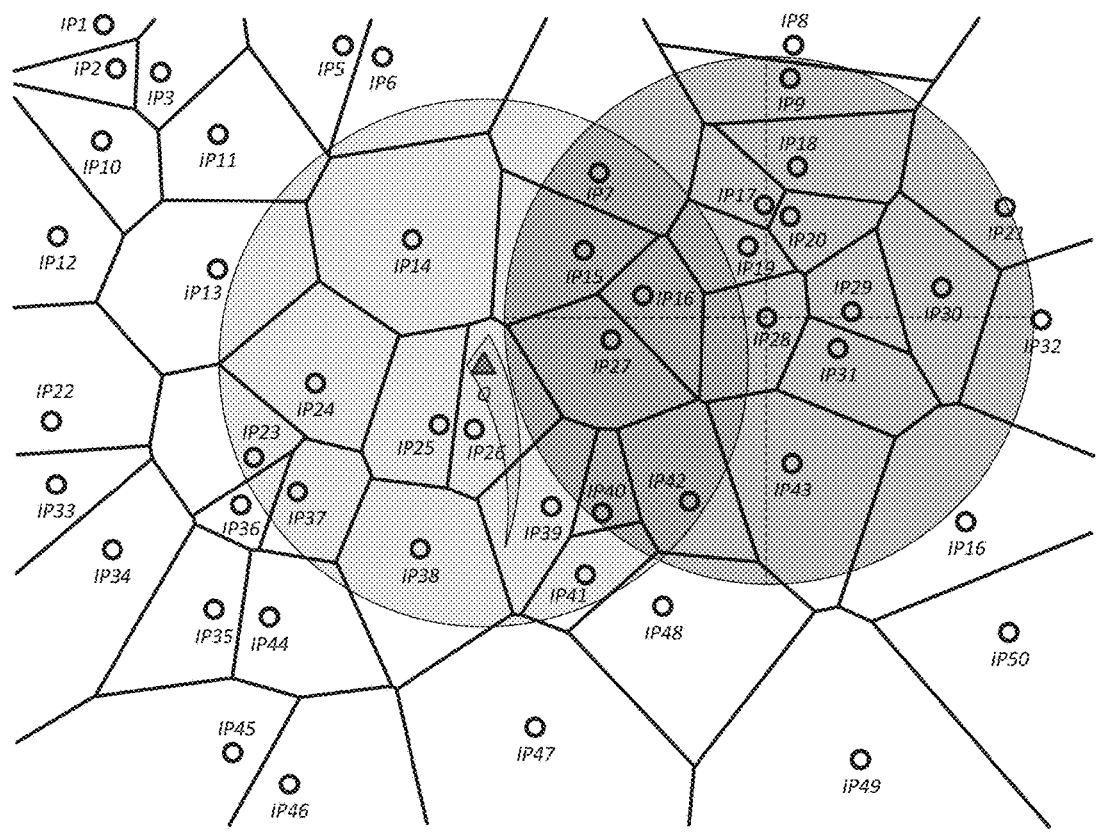
Figure 6J:
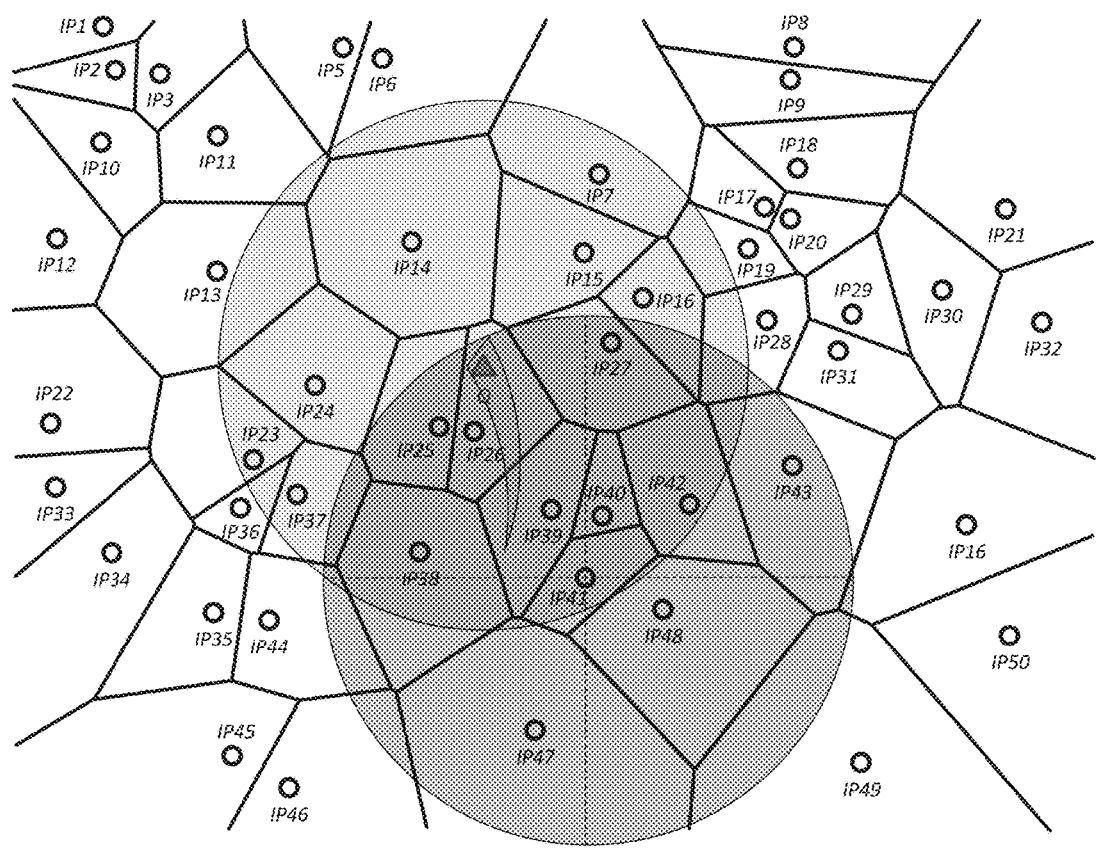
Figure 6K:
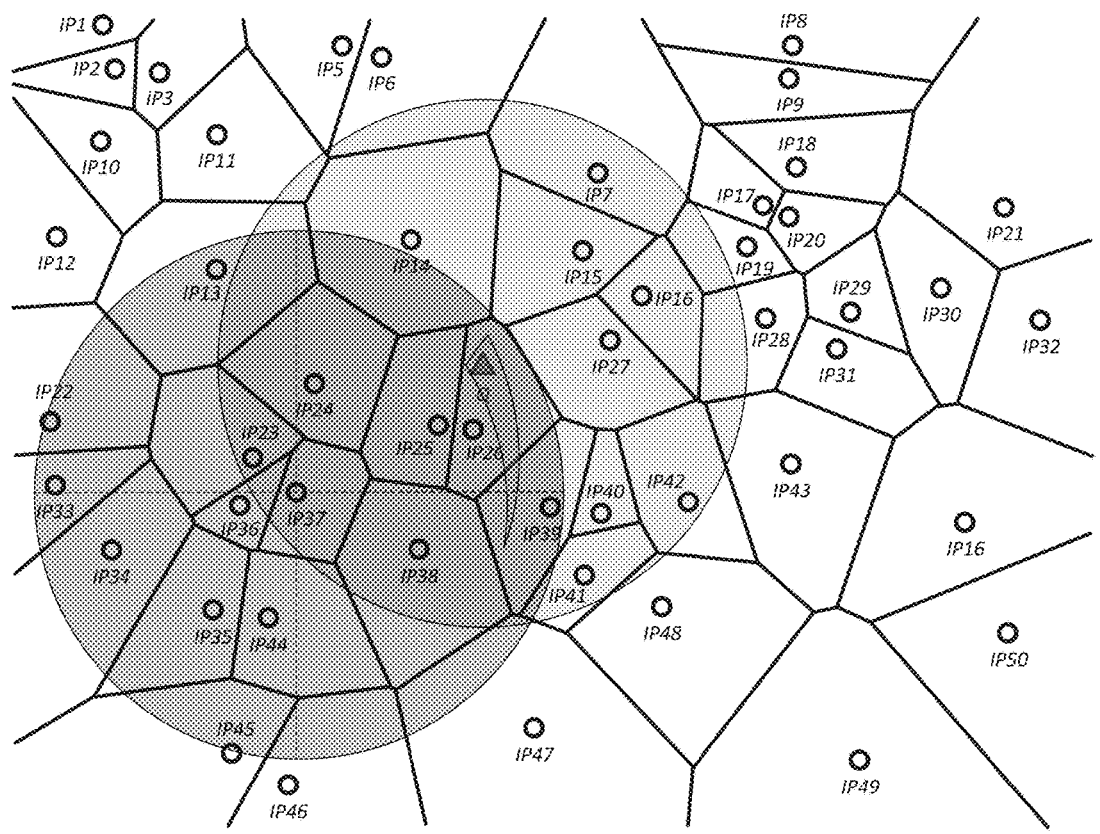
Figure 6L:
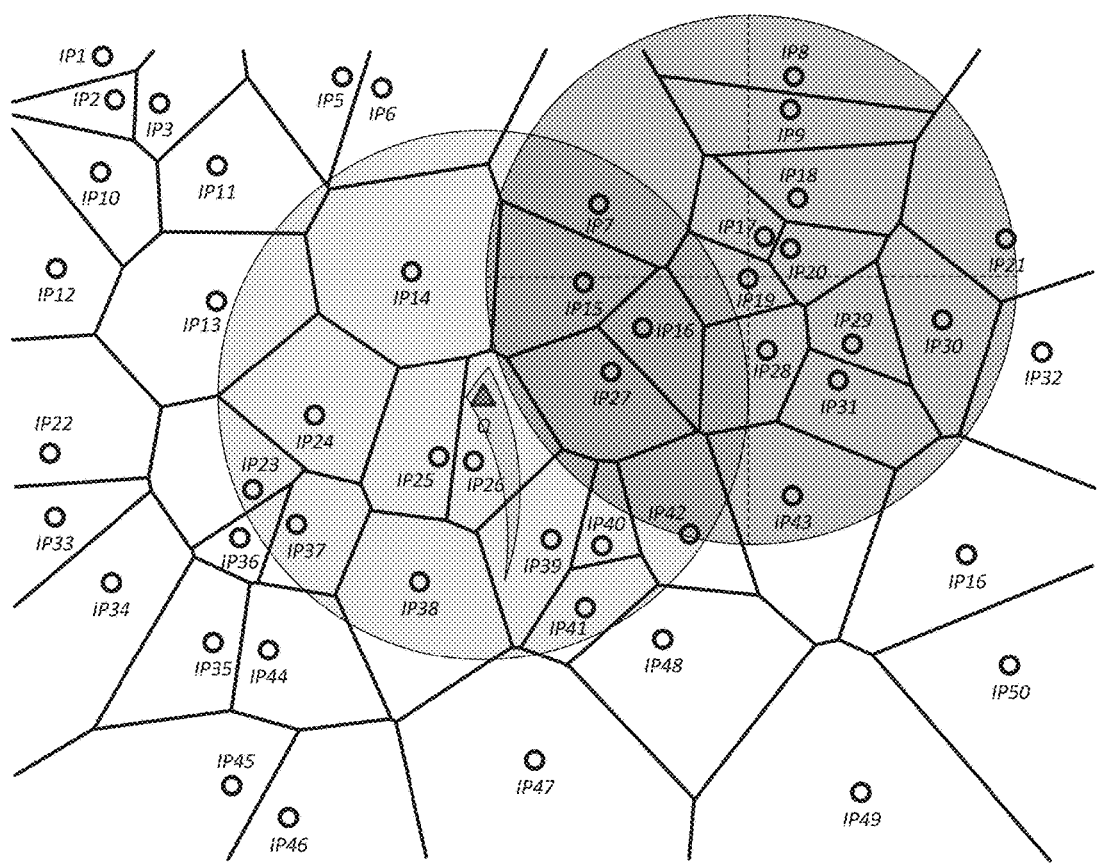
Figure 6M:
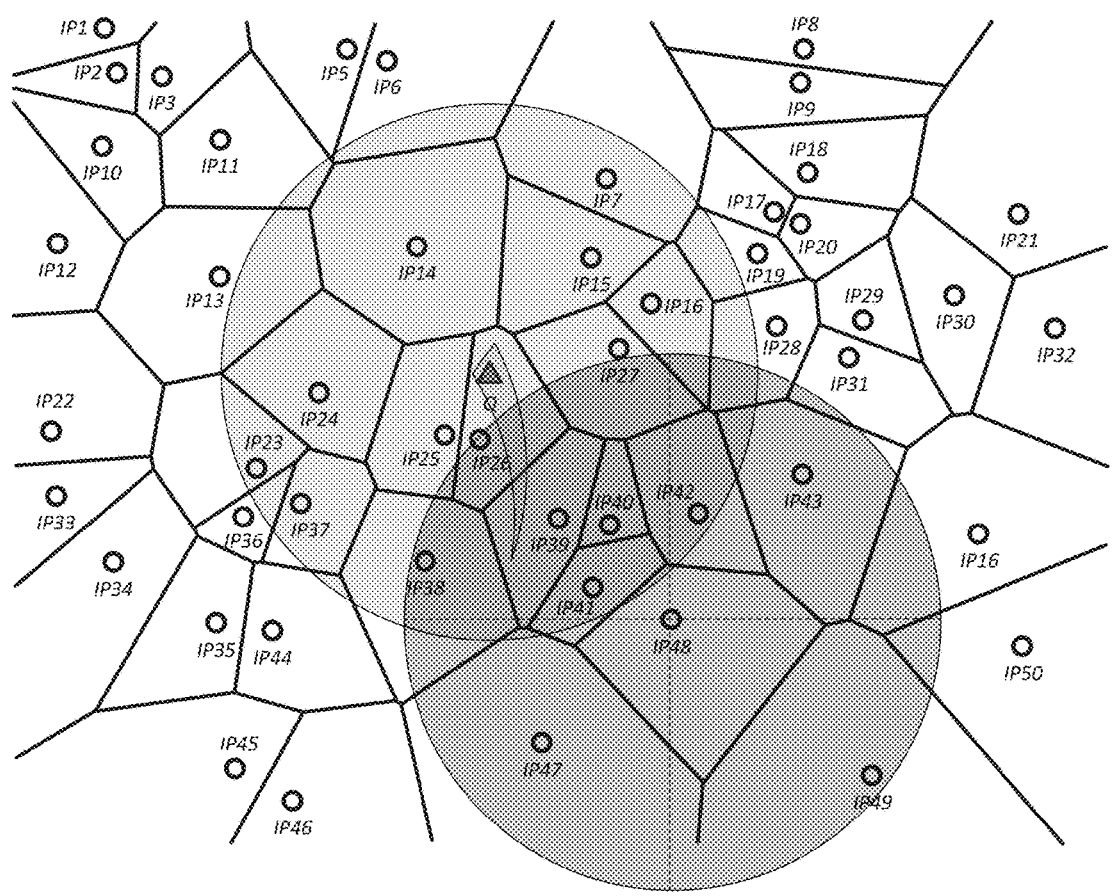
Figure 6N:
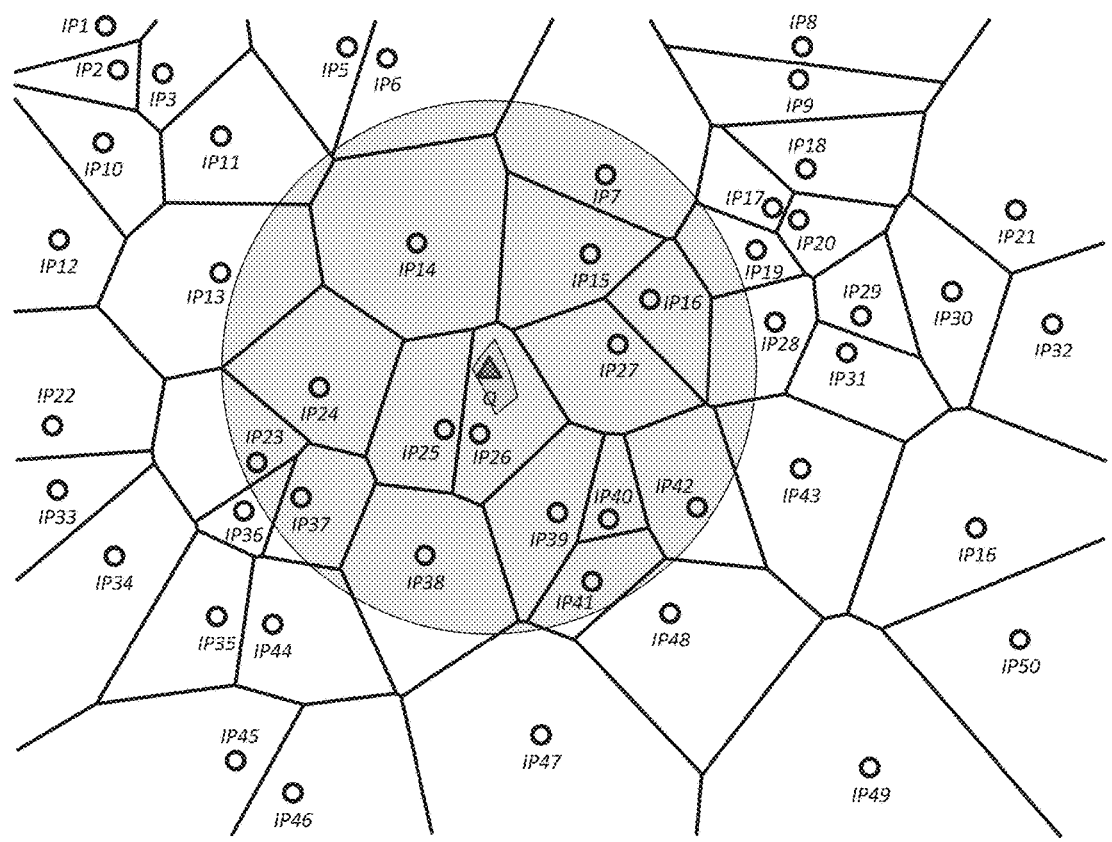
Figure 6O:
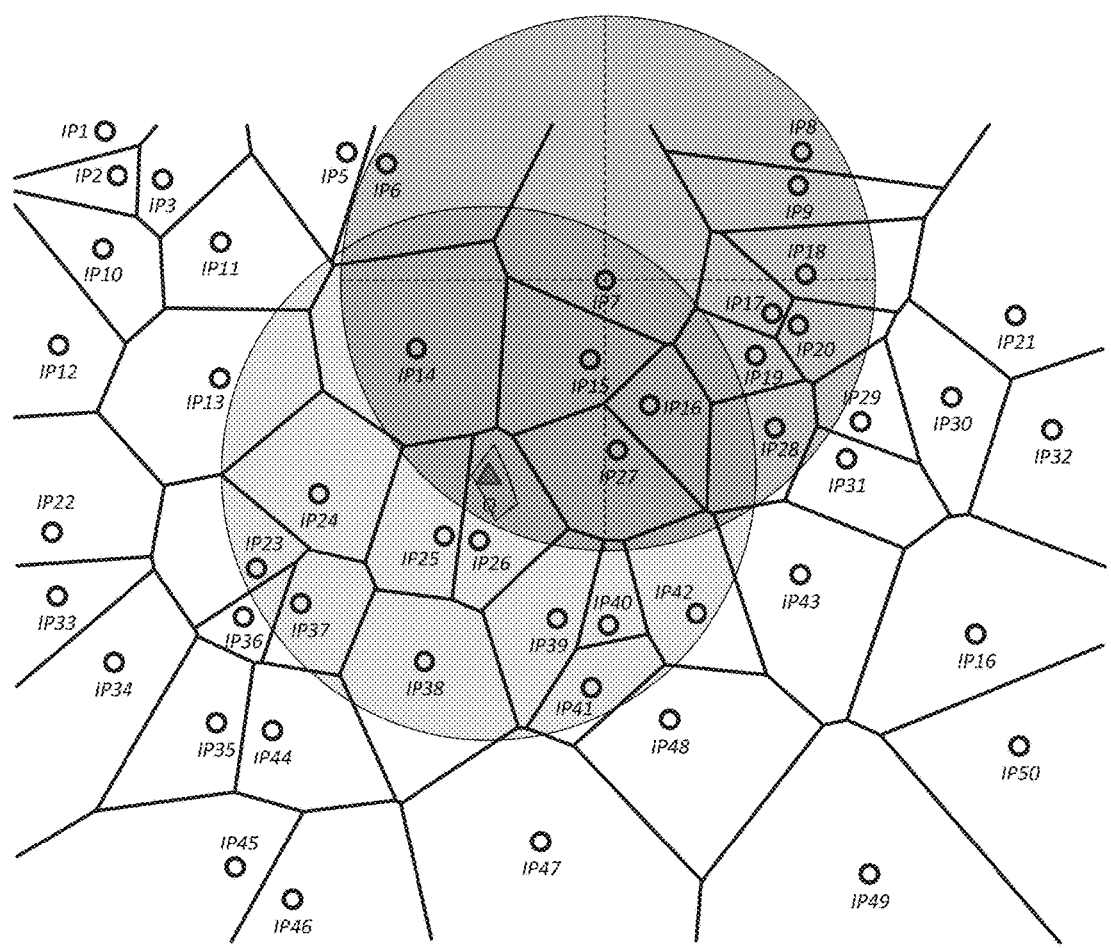
Figure 6P:
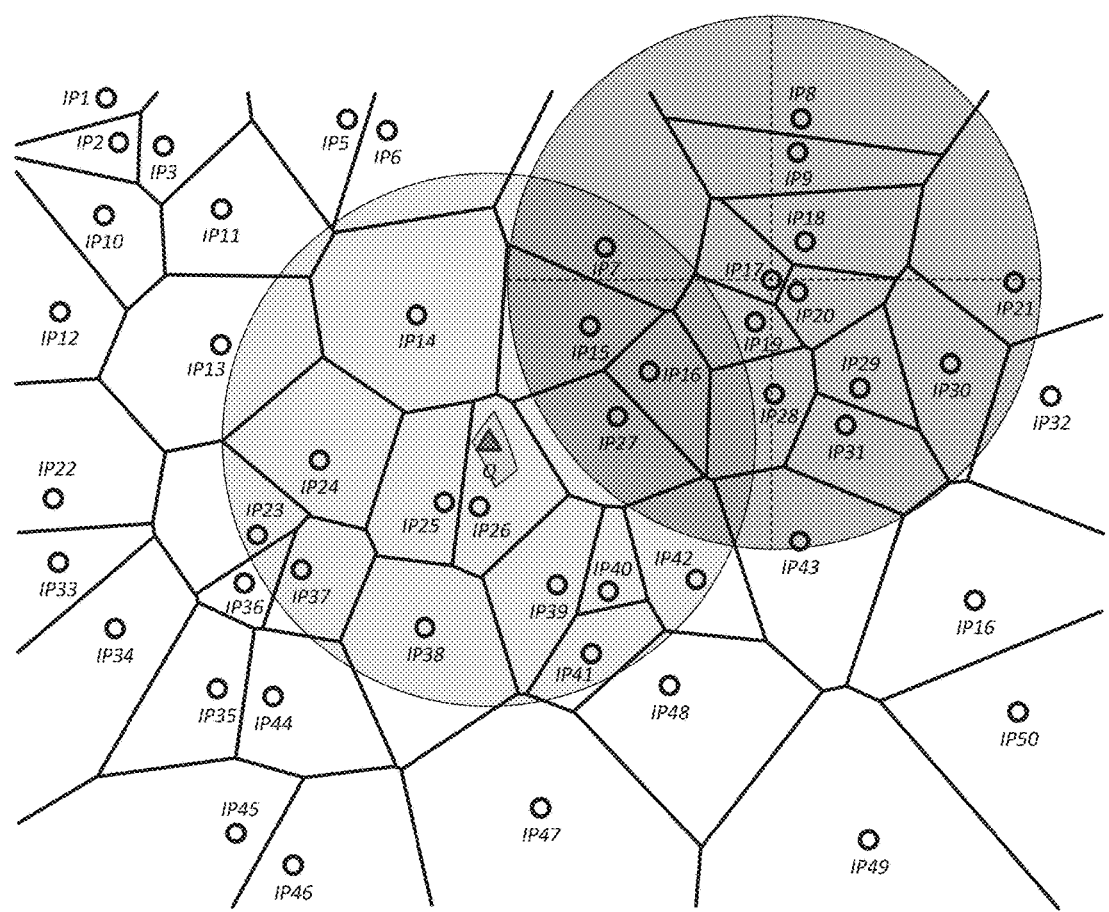
Figure 6Q:
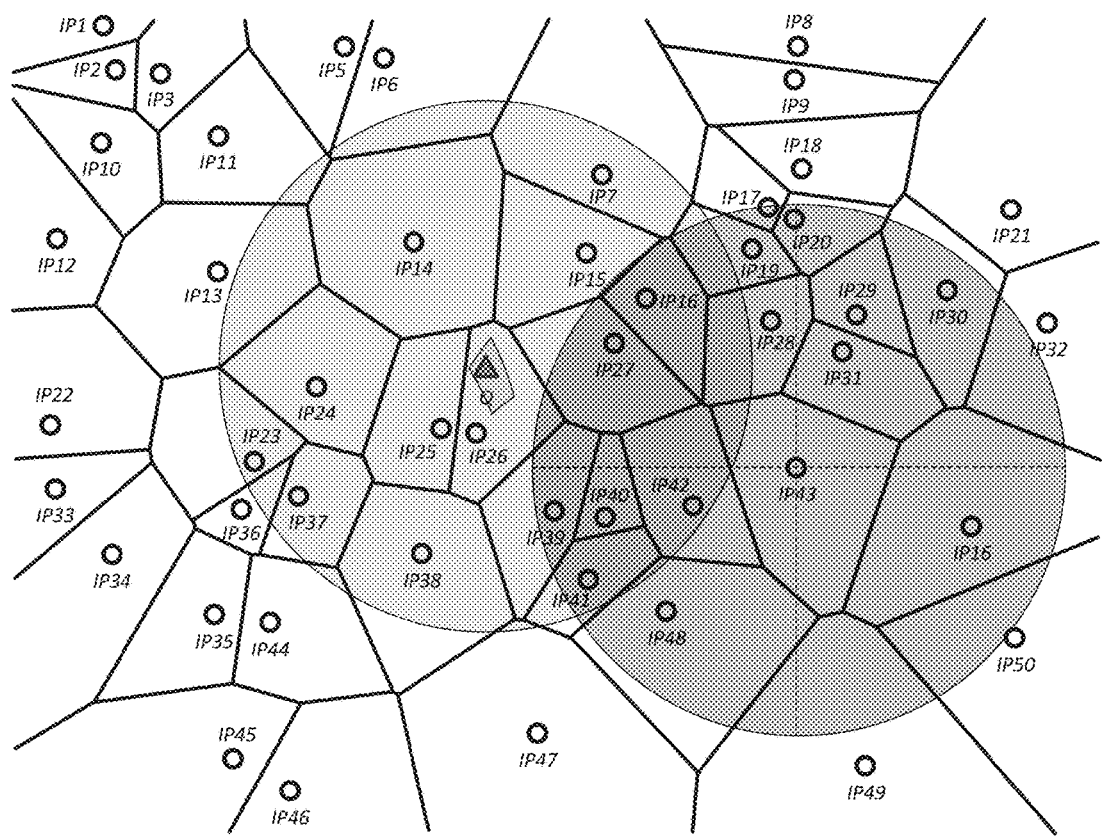
Figure 6R:
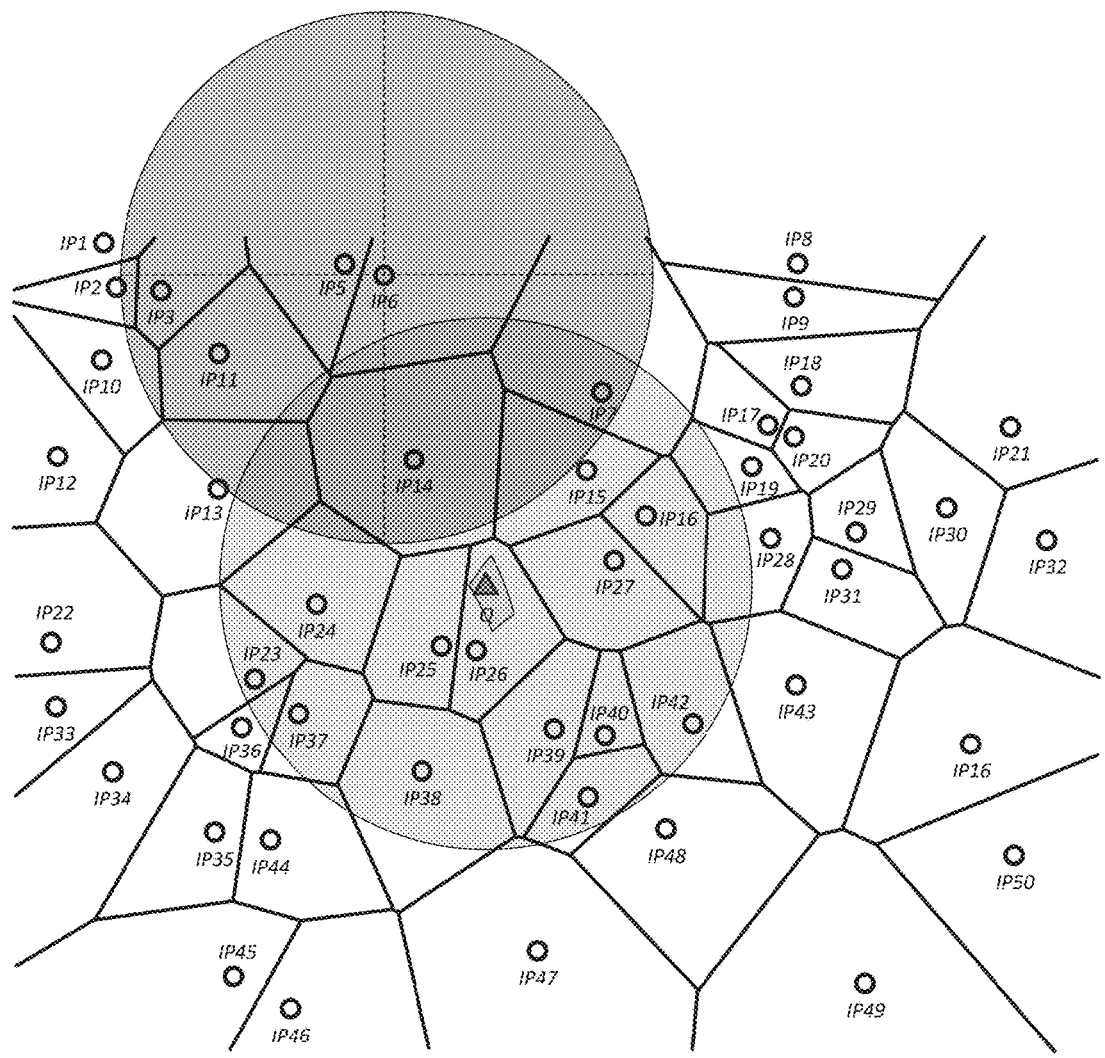
Figure 6S:
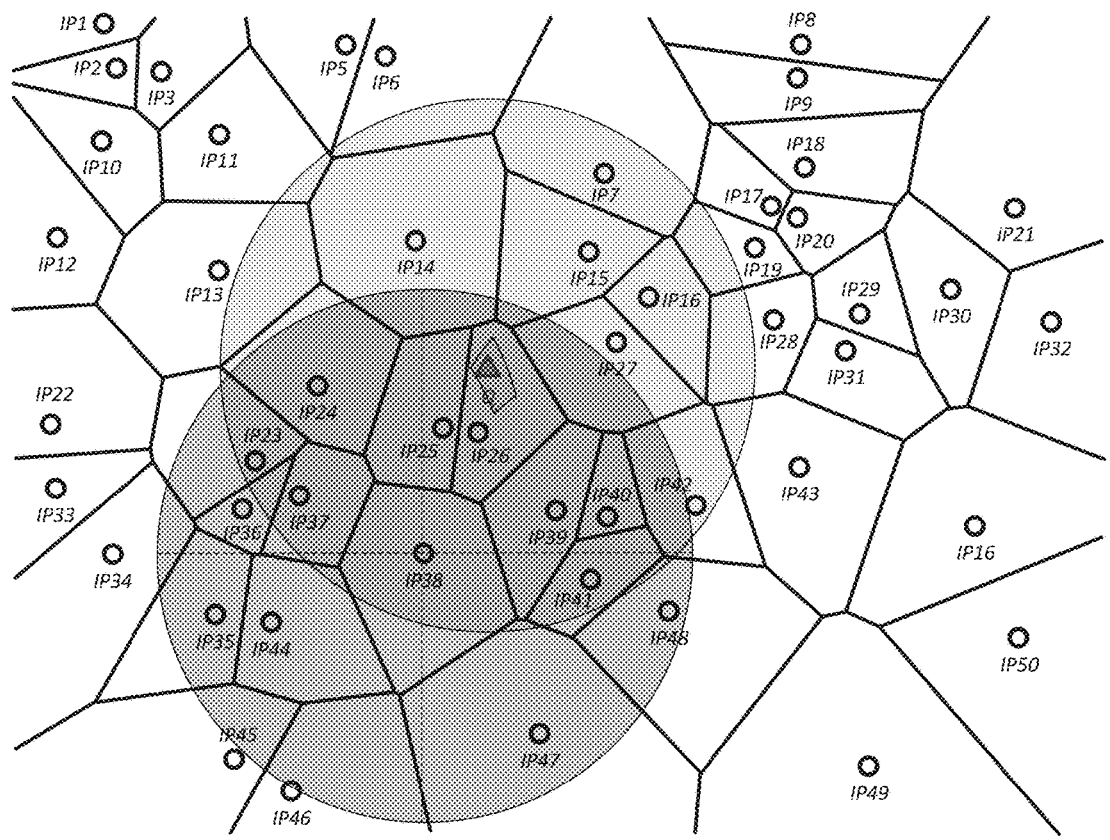
Figure 6T:
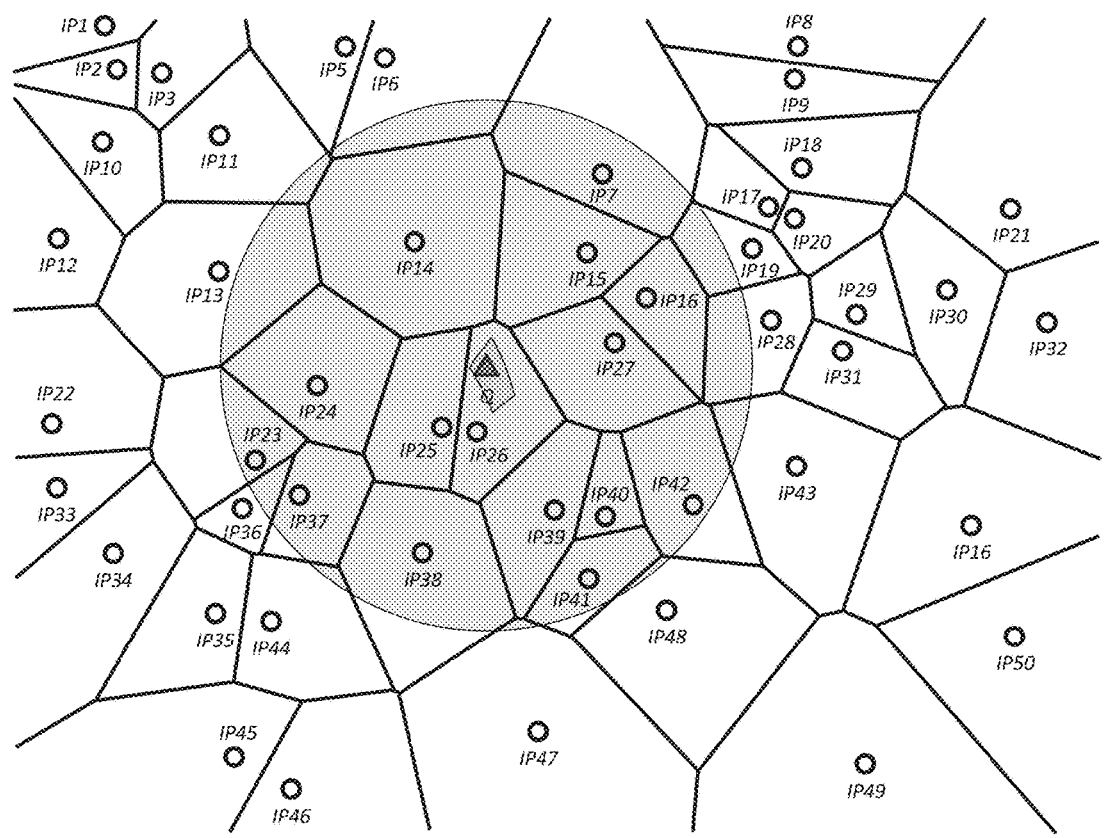

A visual example of workflow steps, according to certain embodiments of the subject invention, can be seen in FIGS. 6A-6T.

An MRQ can be posted to a spatial database partitioned by a Voronoi diagram, as seen in FIG. 6A. An In-Border-Heap and Out-Border Heap can be constructed by various methods includes a modified R-Tree range query on the VoR-tree or a modified Voronoi dynamic k nearest neighbor (k-NN) algorithm for the purpose of this visual explanation, the modified k nearest neighbor is implemented in the MRQ. The 1-NN of the query point, IP26, can be computed using the 1NN algorithm based on VoR-tree. The 1-NN is within the query range, as seen in FIG. 6A. Therefore, the special case is not reached and the 1-NN can be enqueued.

For the explanation of FIG. 6A-6T, the following should be understood. A round can be referred to as an execution of building heaps while the queue is not empty. The contents of MRQ data structures are shown in FIGS. 6A-6T (the contents of the heaps are depicted as a sorted array, in order to easily see the order of the interest points). Round 0 is a special round prior to building any heaps. Additionally, the final round is a special round following the construction of the heaps.

Round 0
Queue: [IP26]
In-Border-Heap: [ ]
Out-Border-Heap: [ ]
Range Query Result: { }

In round 1, the queue is dequeued. The retrieved interest point IP26 is within the query range, so it is included in the range query result. Furthermore, IP26 is not an In-Border point as none of its neighbors (IP14, IP15, IP25, IP27, IP38, and IP39) are uncovered points, so IP26 is not inserted into the In-Border-Heap. The foregoing neighbors of IP26 are enqueued.

Round 1
Queue: [IP14, IP15, IP25, IP27, IP38, IP39]
In-Border-Heap: [ ]
  Out-Border-Heap: [ ] Range Query Result: {IP26}

In round 2, the queue is dequeued. IP14 is a covered point, so it is included in the range query result. IP14 is an In-Border point because at least one of its neighbors, (e.g., IP6, is an uncovered point), so IP14 is inserted into the In-Border-Heap (before inserting IP14 into the heap, IP14's distance to the range query can be cached for later computation (this process is repeated for every insertion of an interest point in the In-Border-Heap and Out-Border-Heap). IP14's neighbors are enqueued.

Round 2
Queue: [IP15, IP25, IP27, IP38, IP39, IP6, IP7, IP11, IP13, IP24]
In-Border-Heap: [IP14]
Out-Border-Heap: [ ]
Range Query Result: {IP26, IP14}

In round 3, the queue is dequeued. IP15 is a covered point, so it is included in the range query result. IP15 is not an In-Border point, so it is not inserted into the In-Border-Heap. IP15's neighbors are enqueued.

Round 3
Queue: [IP25, IP27, IP38, IP39, IP6, IP7, IP11, IP13, IP24, IP16]
In-Border-Heap: [IP14]
Out-Border-Heap: [ ]
Range Query Result: {IP26, IP14, IP15}

In round 4, the queue is dequeued. IP25 is a covered point, so it is included in the range query result. IP25 is not an In-Border point, so it is not inserted into the In-Border-Heap. IP25's neighbors are enqueued.

Round 4
Queue: [IP27, IP38, IP39, IP6, IP7, IP11, IP13, IP24, IP16, IP37]
In-Border-Heap: [IP14]
Out-Border-Heap: [ ]
Range Query Result: {IP26, IP14, IP15, IP25}

In round 5, the queue is dequeued. IP27 is a covered point, so it is included in the range query result. IP27 is not an in-border point, so it is not inserted into the In-Border-Heap. IP27's neighbors are enqueued.

Round 5
Queue: [IP38, IP39, IP6, IP7, IP11, IP13, IP24, IP16, IP37, IP40, IP42]
In-Border-Heap: [IP14]
Out-Border-Heap: [ ]
Range Query Result: {IP26, IP14, IP15, IP25, IP27}

In round 6, the queue is dequeued. IP38 is a covered point, so it is included in the range query result. IP38 is an in-border point, so it is inserted into the In-Border-Heap. IP38's neighbors are enqueued.

Round 6
Queue: [IP39, IP6, IP7, IP11, IP13, IP24, IP16, IP37, IP40, IP42, IP44, IP46, IP47]
In-Border-Heap: [IP38, IP14]
Out-Border-Heap: [ ]
Range Query Result: {IP26, IP14, IP15, IP25, IP27, IP38}

In round 7, the queue is dequeued. IP39 is a covered point, so it is included in the range query result. IP39 is an in-border point, so it is inserted into the In-Border-Heap. IP39's neighbors are enqueued.

Round 7
Queue: [IP6, IP7, IP11, IP13, IP24, IP16, IP37, IP40, IP42, IP44, IP46, IP47, IP41]
  In-Border-Heap: [IP38, IP39, IP14]
Out-Border-Heap: [ ]
Range Query Result: {IP26, IP14, IP15, IP25, IP27, IP38, IP39}

In round 8, the queue is dequeued. IP6 is not a covered point, so it is not included in the range query result. IP6 must be an out-border point, so it is inserted into the Out-Border-Heap. IP6's neighbors are not enqueued.

Round 8
Queue: [IP7, IP11, IP13, IP24, IP16, IP37, IP40, IP42, IP44, IP46, IP47, IP41]
In-Border-Heap: [IP38, IP39, IP14]
Out-Border-Heap: [IP6]
Range Query Result: {IP26, IP14, IP15, IP25, IP27, IP38, IP39}

In round 9, the queue is dequeued. IP7 is a covered point, so it is included in the range query result. IP7 is an in-border point, so it is inserted into the In-Border-Heap. IP7's neighbors are enqueued.

Round 9
Queue: [IP11, IP13, IP24, IP16, IP37, IP40, IP42, IP44, IP46, IP47, IP41, IP8, IP9, IP17, IP19]
In-Border-Heap: [IP7, IP38, IP39, IP14]
Out-Border-Heap: [IP6]
Range Query Result: {IP26, IP14, IP15, IP25, IP27, IP7, IP38, IP39}

In round 10, the queue is dequeued. IP11 is not a covered point, so it is not included in the range query result. IP11 must be an out-border point, so it is inserted into the Out-Border-Heap. IP11's neighbors are not enqueued.

Round 10
Queue: [IP13, IP24, IP16, IP37, IP40, IP42, IP44, IP46, IP47, IP41, IP8, IP9, IP17, IP19]
In-Border-Heap: [IP7, IP38, IP39, IP14]
Out-Border-Heap: [IP6, IP11]
Range Query Result: {IP26, IP14, IP15, IP25, IP27, IP7, IP38, IP39}

In round 11, the queue is dequeued. IP13 is not a covered point, so it is not included in the range query result. IP13 must be an out-border point, so it is inserted into the Out-Border-Heap. IP13's neighbors are not enqueued.
Round 11
Queue: [IP24, IP16, IP37, IP40, IP42, IP44, IP46, IP47, IP41, IP8, IP9, IP17, IP19]
In-Border-Heap: [IP7, IP38, IP39, IP14]
Out-Border-Heap: [IP13, IP6, IP11]
Range Query Result: {IP26, IP14, IP15, IP25, IP27, IP7, IP38, IP39}

In round 12, the queue is dequeued. IP24 is a covered point, so it is included in the range query result. IP24 is an in-border point, so it is inserted into the In-Border-Heap. IP24's neighbors are enqueued.
Round 12
Queue: [IP16, IP37, IP40, IP42, IP44, IP46, IP47, IP41, IP8, IP9, IP17, IP19, IP23]
In-Border-Heap: [IP7, IP38, IP24, IP39, IP14]
Out-Border-Heap: [IP13, IP6, IP11]
Range Query Result: {IP14, IP26, IP25, IP15, IP7, IP27, IP38, IP39, IP24}

In round 13, the queue is dequeued. IP16 is a covered point, so it is included in the range query result. IP16 is an in-border point, so it is inserted into the In-Border-Heap. IP16's neighbors are enqueued.
Round 13
Queue: [IP37, IP40, IP42, IP44, IP46, IP47, IP41, IP8, IP9, IP17, IP19, IP23, IP28]
In-Border-Heap: [IP7, IP38, IP16, IP24, IP39, IP14]
Out-Border-Heap: [IP13, IP6, IP11]
Range Query Result: {IP14, IP26, IP25, IP15, IP7, IP27, IP38, IP39, IP24, IP16}

In round 14, the queue is dequeued. IP37 is a covered point, so it is included in the range query result. IP37 is an in-border point, so it is inserted into the In-Border-Heap. IP37's neighbors are enqueued.
Round 14
Queue: [IP40, IP42, IP44, IP46, IP47, IP41, IP8, IP9, IP17, IP19, IP23, IP28, IP36]
In-Border-Heap: [IP37, IP7, IP38, IP16, IP24, IP39, IP14]
Out-Border-Heap: [IP13, IP6, IP11]
Range Query Result: {IP14, IP26, IP25, IP15, IP7, IP27, IP38, IP39, IP24, IP16, IP37}

In round 15, the queue is dequeued. IP40 is a covered point, so it is included in the range query result. IP40 is not an in-border point, so it is not inserted into the In-Border-Heap. IP40's neighbors are enqueued.
Round 15
Queue: [IP42, IP44, IP46, IP47, IP41, IP8, IP9, IP17, IP19, IP23, IP28, IP36]
In-Border-Heap: [IP37, IP7, IP38, IP16, IP24, IP39, IP14]
Out-Border-Heap: [IP13, IP6, IP11]
Range Query Result: {IP14, IP26, IP25, IP15, IP7, IP27, IP38, IP39, IP24, IP16, IP37, IP40}

In round 16, the queue is dequeued. IP42 is a covered point, so it is included in the range query result. IP42 is an in-border point, so it is inserted into the In-Border-Heap. IP42's neighbors are enqueued.
Round 16
Queue: [IP44, IP46, IP47, IP41, IP8, IP9, IP17, IP19, IP23, IP28, IP36, IP43, IP48]
In-Border-Heap: [IP42, IP37, IP7, IP38, IP16, IP24, IP39, IP14]
Out-Border-Heap: [IP13, IP6, IP11]
Range Query Result: {IP14, IP26, IP25, IP15, IP7, IP27, IP38, IP39, IP24, IP16, IP37, IP40, IP42}

In round 17, the queue is dequeued. IP44 is not a covered point, so it is not included in the range query result. IP44 must be an out-border point, so it is inserted into the Out-Border-Heap. IP44's neighbors are not enqueued.
Round 17
Queue: [IP46, IP47, IP41, IP8, IP9, IP17, IP19, IP23, IP28, IP36, IP43, IP48]
In-Border-Heap: [IP42, IP37, IP7, IP38, IP16, IP24, IP39, IP14]
Out-Border-Heap: [IP13, IP6, IP44, IP11]
Range Query Result: {IP14, IP26, IP25, IP15, IP7, IP27, IP38, IP39, IP24, IP16, IP37, IP40, IP42}

In round 18, the queue is dequeued. IP46 is not a covered point, so it is not included in the range query result. IP46 must be an out-border point, so it is inserted into the Out-Border-Heap. IP46's neighbors are not enqueued.
Round 18
Queue: [IP47, IP41, IP8, IP9, IP17, IP19, IP23, IP28, IP36, IP43, IP48]
In-Border-Heap: [IP42, IP37, IP7, IP38, IP16, IP24, IP39, IP14]
Out-Border-Heap: [IP13, IP6, IP44, IP11, IP46]
Range Query Result: {IP14, IP26, IP25, IP15, IP7, IP27, IP38, IP39, IP24, IP16, IP37, IP40, IP42}

In round 19, the queue is dequeued. IP47 is not a covered point, so it is not included in the range query result. IP47 must be an out-border point, so it is inserted into the Out-Border-Heap. IP47's neighbors are not enqueued.
Round 19
Queue: [IP41, IP8, IP9, IP17, IP19, IP23, IP28, IP36, IP43, IP48]
In-Border-Heap: [IP42, IP37, IP7, IP38, IP16, IP24, IP39, IP14]
Out-Border-Heap: [IP13, IP6, IP44, IP11, IP47, IP46]
Range Query Result: {IP14, IP26, IP25, IP15, IP7, IP27, IP38, IP39, IP24, IP16, IP37, IP40, IP42}

In round 20, the queue is dequeued. IP41 is a covered point, so it is included in the range query result. IP41 is an in-border point, so it is inserted into the In-Border-Heap. IP41's neighbors are enqueued.
Round 20
Queue: [IP8, IP9, IP17, IP19, IP23, IP28, IP36, IP43, IP48]
In-Border-Heap: [IP42, IP41, IP37, IP7, IP38, IP16, IP24, IP39, IP14]
Out-Border-Heap: [IP13, IP6, IP44, IP11, IP47, IP46]
Range Query Result: {IP14, IP26, IP25, IP15, IP7, IP27, IP38, IP39, IP24, IP16, IP37, IP40, IP42, IP41}

The next four rounds consist of popped interest points that are out-border points. As such, the next four rounds are successive insertions of the popped interest points (IP8, IP9, IP17, and IP19) into the Out-Border-Heap, leaving the In-Border-Heap and the range query result unaffected. As such, rounds 21-23 are not shown or described, round 24 is shown but not described.
Round 24
Queue: [IP23, IP28, IP36, IP43, IP48]
In-Border-Heap: [IP42, IP41, IP37, IP7, IP38, IP16, IP24, IP39, IP14]
Out-Border-Heap: [IP13, IP19, IP17, IP6, IP44, IP11, IP47, IP9, IP8, IP46]
Range Query Result: {IP14, IP26, IP25, IP15, IP7, IP27, IP38, IP39, IP24, IP16, IP37, IP40, IP42, IP41}
Round 25
Queue: [IP28, IP36, IP43, IP48, IP22, IP33, IP34]
In-Border-Heap: [IP23, IP42, IP41, IP37, IP7, IP38, IP16, IP24, IP39, IP14]
Out-Border-Heap: [IP13, IP19, IP17, IP6, IP44, IP11, IP47, IP9, IP8, IP46]

Range Query Result: {IP14, IP26, IP25, IP15, IP7, IP27, IP38, IP39, IP24, IP16, IP37, IP40, IP42, IP41, IP23}

In round 25, the queue is dequeued. IP23 is a covered point, so it is included in the range query result. IP23 is an in-border point, so it is inserted into In-Border-Heap. IP23's neighbors are enqueued.

The remaining rounds consist of popped interest points that are out-border points. The queue then becomes empty as the remaining interest points in the queue are inserted into Out-Border-Heap. As such, only round 32 is shown.

Round 32
Queue: [ ]
In-Border-Heap: [IP23, IP42, IP41, IP37, IP7, IP38, IP16, IP24, IP39, IP14]
Out-Border-Heap: [IP36, IP13, IP28, IP19, IP48, IP17, IP43, IP6, IP44, IP11, IP47, IP34, IP22, IP33, IP9, IP8, IP46]
Range Query Result: {IP14, IP26, IP25, IP15, IP7, IP27, IP38, IP39, IP24, IP16, IP37, IP40, IP42, IP41, IP23}

As seen in the Figures and accompanying descriptions, the range query result is computed, and the In-Border-Heap and the Out-Border-Heap are built. As seen in FIG. 6B, IP23 is popped from the In-Border-Heap and the domain region of IP23 is constructed. As seen in FIG. 6C, the domain region surrounding IP23 is defined as the initial candidate safe region; either the In-Border-Heap or Out-Border-Heap is not empty. The tops of In-Border-Heap and Out-Border-Heap are IP42 and IP36, respectively, and IP42 is closest to the query range. As such, IP42 is popped from the In-Border-Heap, IP42's domain region is computed, and the candidate safe region is refined. A depiction of the IP42's domain region and the intersection between the domain region and the candidate safe region is shown in FIG. 6D. The resulting candidate safe region after refinement is shown in FIG. 6E. The procedure is repeated until the In-Border-Heap or Out-Border-Heap is not empty again. The tops of the In-Border-Heap and Out-Border-Heap, IP41 and IP36, respectively, are compared and IP36 is shown to be the closest to the query range. IP35 is popped from the Out-Border-Heap and IP36's domain region is computed, and the candidate safe region is refined. IP36's computed domain region is shown in FIG. 6F. The refinement of the candidate safe region is shown in FIG. 6G.

For illustration purposes, an execution of processing an interest point is described. Border point IP13 is processed and the computed domain region is shown in FIG. 6H. IP13's domain region nearly misses the candidate safe region and there is no intersection between the domain region and the candidate safe region. As such, the candidate safe region stays the same. Out-border point IP28 can be processed next and its computed domain region shown in FIG. 6I. As with the previous interest point, its domain region does not intersect the candidate safe region, so the candidate safe region stays the same. As seen in FIG. 6J, in-border-point IP41 can be processed next. IP41's computed domain region fully intersects the candidate safe region and therefore the intersection between the domain region and the candidate safe region is simply the candidate safe region. As a result, the candidate safe region stays the same.

A similar result occurs with the next processed interest points IP37 and IP19 as depicted in FIGS. 6K and 6L, respectively. Out-border point IP48 is processed next as shown in FIG. 6M. IP48's computed domain region intersects the candidate safe region. As such, the candidate safe region is refined as seen in FIG. 6N. As it turns out, none of the remaining interest points in the In-Border-Heap and the Out-Border-Heap contribute to the candidate safe region, (i.e., they do not trigger a refinement of the candidate safe region). The computed safe regions for the remaining interest points are shown (in order) in FIGS. 6O through 6S. The final safe region is depicted in FIG. 6T. A two-tuple comprising the range query result computed and the final safe region computed can be returned. The range query result can be returned in as any collection of the interest points, (e.g., an unordered set, or an array). Similarly, the safe region can be returned as any object that can represent the area the safe region covers, (e.g., a collection of points).

A system for performing a mobile range query can comprise a first (non-transitory) computer readable medium storing instructions, that when executed (e.g., by a processor) transmits a mobile range query; and a second (non-transitory) computer readable medium storing instructions, storing and indexing interest points, that when executed (e.g., by a processor) performs the following steps: (1) receive a mobile range query from a user device; (2) compute a range query result and builds two min-heaps that contain in-border interest points and out-border points respectively; (3) construct an initial candidate safe region; (4) iteratively refine the candidate safe region by continuously popping the top elements in the said two min-heaps while they are not empty, computing the intersections of the domain region of the said top elements and the candidate safe region, and re-defining the candidate safe region using the said intersections; and (5) return the MRQ result.

In certain embodiments, the second (non-transitory) computer readable medium stores and indexes the interest points by using a VoR-tree.

In another embodiment one of the two min-heaps is designated as an In-Border-Heap that comprises in-border points. An in-border point is an interest point that is within the query range that has a least one point as an adjacent generator that is not within the query range. The second min-heap can be designated as an Out-Border-Heap that comprises out-border points. An out-border point is a point that satisfies two conditions: it is out of the range query, it is a neighbor of an in-border point.

In yet another embodiment the adjacent generators or neighbors of a point are the generating points of its adjacent Voronoi polygons.

In another embodiment of the subject invention, a method to compute the range query and build two heaps uses an R-tree range query on the VoR-tree, in addition to the regular range query. The method to compute the range query and build two heaps can use a modified R-tree range query on the VoR-tree, in additional to the regular range query. Said modification of the R-tree range query on the VoR-tree comprising a step of determining whether an interest point is an in-border-point for all leaf nodes that are covered by the range query, and further checking and determining whether the neighbors of these in-border-point are out-border-point. The in-border-points and out-border-point can be then inserted into the two heaps respectively.

In another embodiment of the subject invention, the method to compute the range query and build two heaps uses the Dynamic Voronoi k nearest neighbor (kNN) algorithm, wherein the method to compute the range query and build two heaps can be by using a modified Dynamic Voronoi k nearest neighbor (kNN) algorithm. The termination condition of the said modified Dynamic Voronoi k nearest neighbor (kNN) algorithm is that an interest point is just out of the range query circle. Said modified procedure may also collect neighbors information for each 1 to k elements and determine whether they are in-border points and further determine whether their neighbors are out-border points, in-border points and out-border-point can be then inserted into the two heaps respectively.

If the computed range query result is empty, a conservative region can be constructed, the MRQ result can be returned to the first computer, and the MRQ query process ended.

In another embodiment of the subject invention, the conservative safe region is a circle centered at the query point whose radius is equal to the distance between the query point and closest interest point subtracted by the radius of the query range. Constructing the initial candidate safe region comprises: (1) popping the In-Border-Heap that contains the in-border points; (2) computing the domain region of the retrieved interest point using the query range as a radius; and (3) making the domain region of the retrieved interest point be the initial candidate safe region.

The candidate safe region can be iteratively refined by continuously popping the top elements in the said two min-heaps while the heaps are not empty, computing the intersections of the domain region of the said top elements and the candidate safe region, and re-defining the candidate safe region using the said intersections.

The following refining steps are repeated if either In-Border-Heap or Out-Border-Heap is non-empty: (1) letting QR-distance of a point denote the distance between said point and the query range circle; (2) if the top of the In-Border-Heap's QR-distance is less than or equals to that of the top of Out-Border-Heap, pop the In-Border-Heap; computing the domain region for the retrieved interest point; determining whether there is an intersection between the domain region and the candidate safe region; if there is an intersection, compute it; refining the candidate safe region by re-defining it as the intersection.

If the top of the Out-Border-Heap's QR-distance is less than that of the top of the In-Border-Heap: (1) pop the Out-Border-Heap; (2) compute the domain region for the retrieved interest point; (3) determine whether there is an intersection between the domain region and the candidate safe region; and (4) if there is an intersection, compute it; refine the candidate safe region by re-defining it as the intersection subtracted from the candidate safe region.

In another embodiment of the subject invention, determining whether there is an intersection between the domain region and the candidate safe region can be further optimized to improve the computing efficiency by adding the following procedure: (1) constructing a bounding circle, a circle centered at the query point whose radius is equal to the distance between the query point and the farthest point in the candidate safe region; (2) determining whether the domain region intersects the bounding circle. If the domain region does not intersect the bounding circle, then the domain region cannot intersect the candidate safe region, thereby eliminating the computing need to directly determine the intersection between the domain region and the candidate safe region, which can have a complex shape.

Returning the MRQ result can comprise returning the range query result and the final safe region. The candidate safe region and the final safe region can also be represented as a list of influential objects, also referred to as guard objects.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Figure 2:
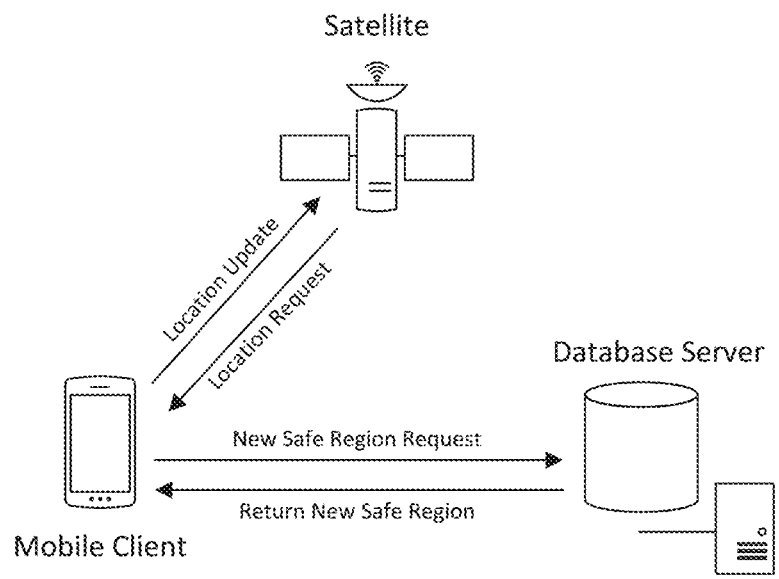
FIG. 2 shows a diagram of a client-server paradigm that can be utilized to process a Mobile Range Query.

In the client-server model as in FIG. 2, the client posts queries to the server that performs the computation of MRQs. Consider a user that is walking on a sidewalk. Through an application installed on an Internet-enabled smartphone, the user is subscribed to a restaurant recommendation service. The foregoing service always notifies the user of the restaurants that fall within 1 mile of the user's location. Conventional methods would trigger the app to continuously monitor the smartphone's position and send multiple range queries to the server; however, embodiments of the subject invention only require the app to send one range query to the server.

It is assumed that the server processes the query in main-memory; however, in many use case examples, this is not necessarily true, (i.e., the server may process the query on-disk or through some other storage medium). In fact, data objects may not even be stored in main-memory but in secondary memory. When the user's range query is posted to the server, the server processes the query and returns the range query result and as the safe region to the user's smartphone. The user continues to move within the safe region; however, the user's smartphone does not repost the range query because the results that were returned are still valid. The user finally moves outside the safe region, triggering his smartphone to send an update query to the server.

The server computes the new result and safe region, and returns them to the user's smartphone once again.

Example 2

In the local computation model, there is no server. Instead, a location-aware device such as a GPS uses points of interest, (e.g., shops stored on some local storage device, and processes range queries locally). Navigation systems such as GPS often have limited primary storage and processing power, rendering the computation of range query results whenever the device moves infeasible. The safe region returned by the herein disclosed method eliminates the need to reprocess range queries whenever the device moves as the query results are guaranteed not to change.

Example 3

A user is walking with a GPS receiver device in shopping district. As the user is walking, posts a range query to the device to know the clothing stores that lie within 200 meters of the user's location. The GPS receiver device processes the range query locally and returns the result of interest points that intersect the query range and the safe region. The user continues walking within the safe region. The GPS receiver device does not need to process any additional queries within this region, reducing processing costs on the user's GPS device. The compressed representation of the safe region reduces the need for significant memory usage. When the user exits the safe region, the GPS must reprocess the range query, repeating the foregoing procedure.

Example 4

A user walks in a market and uses the proprietary Generic Brand A SmartApp application on the user's smartphone to search for nearby Generic Brand A products. The Generic Brand A SmartApp dynamically configures a local parameter that determines the size of the query range for a range query. The application contacts a remote server to post the MRQ. The server returns to the client locations of nearby Generic Brand A products, advertisements and suggestions for Generic Brand A products, and influential objects and their statuses. The application's user-friendly interface displays the aforementioned data on the user's smartphone screen.

Example 5

A user subscribes to Generic Brand X and Generic Brand Y via a location-based service through which the user has a tablet, smartwatch, smartphone, and other smart devices registered. As the user walks in a mall, the service sends the smartwatch and smartphone push notifications about nearby stores that sell Generic Brand X and/or Generic Brand Y products. An algorithm has been disclosed in the foregoing for the effective resolution of MRQs and returning a safe region, in which the results of a range query do not change.

While the foregoing exemplary embodiment and examples of the present invention have been presented, they do not limit the scope of the invention and its use cases but serve as illustrations of use cases. Embodiments do not require specific use of a GPS receiver device, database, smartphone, smartphone application to be used in the deployment of the present invention. Furthermore, the herein disclosed method can utilize any combination of technologies to provide positioning, such as satellite, Bluetooth, Wi-Fi, mobile base stations, etc. Embodiments of the subject invention can be implemented locally, remotely, on an internet-enabled or non-internet-enabled personal computer (PC), server, smartphone, any device or equipment, or any combination of the above, all possibly interconnected via a wired or wireless network.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. A system for performing a computer based mobile range query, the system comprising:
    a user device; and
    a computer readable medium comprising instructions that when executed causes at least one processor to:
        receive a mobile range query (MRQ), the mobile range query (MRQ) comprised of a radius of the mobile range query, a query point location, and a request to produce interest points contained within a circular area having the radius and centered at the query point location, and a safe region, the safe region being an area surrounding the query point location such that for each interest point contained in the safe region, the set of interest points within the radius from the query point is the same;
        store and index, in computer memory, a plurality of interest points by using a Voronoi Diagram R-tree (VoR-tree);
        compute the range query result for the query point, the range query result being the interest points within the radius from the query point;
        construct a first min-heap to store a plurality of in-border interest points, each in-border interest point being an interest point that is within the radius from the query point and having at least one adjacent VoR neighbor that is located farther than the radius from the query point;
        construct a second min-heap to store a plurality of out-border interest points, each out-border interest point being an interest point that is within the radius from the query point and has a least one adjacent VoR neighbor in-border interest point;
        construct an initial candidate safe region as a superset of the safe region, by iteratively refining the safe region by searching each top element in said two min-heaps while the min-heaps are not empty, computing intersections of a domain region of the top elements and the candidate safe region, and re-defining the candidate safe region using the intersections, the domain region being the area around the top element with the radius of the range query;
        return to the user device the result of the range query and the safe region, the user device being configured to check change in a status and, when the change in the status occurs, invalidate the result of the range query and the safe region and then send an update query; and
        when the computed range query result is empty, construct a conservative region comprising a circular area centered on the query point and having the radius of d−r, d being the distance between the query point and closest interest point and r being the radius of the range query, and replace the safe region with the conservative region in the MRQ result.

2. The system of claim 1, the in-border and the out-border interest points being computed while computing the range query result by using an R-tree range query method on the VoR-tree.

3. The system of claim 1, the in-border and the out-border interest points being computed while computing the range query result by using a modified R-tree range query method on the VoR-tree,
the modified R-tree range query on the VoR-tree comprising:
determining whether an interest point is an in-border interest point for all leaf nodes that are covered by the range query, and
determining whether each neighbor of each in-border interest point is an out-border interest point; and
inserting the in-border interest points and out-border interest points into the first and second min-heaps, respectively.

4. The system of claim 1, the in-border and the out-border interest points being computed while computing the range query result by using a Dynamic Voronoi k nearest neighbor (kNN) algorithm.

5. The system of claim 4, the in-border and the out-border interest points being computed while computing the range query result by using a modified Dynamic Voronoi k nearest neighbor (kNN) algorithm, the algorithm further comprising:
determining whether an interest point's adjacent k-nearest neighbors are in-border interest points or out-border interest points; and
inserting the in-border interest points and out-border interest points into the first and second min-heaps, respectively;
a termination condition being that an interest point is outside of the range query circle.

6. The system of claim 1, the computer readable medium comprising instructions that when executed further causes at least one processor to:
construct a candidate safe region comprising the following steps:
retrieve an interest point from the first heap;
compute the domain region of the interest point in the first heap,
the domain region being the area around the interest point with the radius of the range query; and
make the domain region of the retrieved interest point be the candidate safe region.

7. The system of claim 6, the computer readable medium comprising instructions that when executed further causes at least one processor to:
iteratively refine the candidate safe region being by continuously searching the top interest points in the two min-heaps while they are not empty;
computing the intersections of the domain region of the top interest point of either the first min-heap and the candidate safe region or second min-heap and the candidate safe region; and
re-defining the candidate safe region as the area of the intersection.

8. The system of claim 6, the computer readable medium comprising instructions that when executed further causes at least one processor to:
repeat the following refining steps if either one of the two min-heaps is non-empty:
detect each top interest point whose domain region has not been computed in the first min-heap and the second min-heap;
detect a distance between the top interest point in the first min-heap and the query range circle;
detect a distance between the top interest point in the second min-heap and the query range circle;
compute a domain region of either the top interest point in the first min-heap or second min-heap, whose distance to the query range circle is less than the distance of the top interest point and query range circle of the other heap;
compute an intersection between the domain region and the candidate safe region; and
redefine the candidate safe region as the intersection.

9. The system of claim 8, the method of redefining the candidate safe region being optimized by the following steps:
construct a bounding circle centered at the query point with a radius equal to the distance between the query point and the farthest point in the candidate safe region, the bounding circle not intersecting with the domain region;
foregoing computation of domain region of the query point whose bounding circle does not intersect with candidate safe region.

10. The system of claim 1, the safe region being represented as a list of influential objects or guard objects.

11. A method for performing a computer based mobile range query, the system comprising:
providing a user device; and
providing a computer readable medium comprising instructions that when executed causes at least one processor to:
receive a mobile range query (MRQ), the mobile range query (MRQ) comprised of a radius of the mobile range query, a query point location, and a request to produce interest points contained within a circular area having the radius and centered at the query point location, and a safe region, the safe region being an area surrounding the query point location such that for each interest point contained in the safe region, the set of interest points within the radius from the query point is the same;
store and index, in computer memory, a plurality of interest points by using a Voronoi Diagram R-tree (VoR-tree);
compute the range query result for the query point, the range query result being the interest points within the radius from the query point;
construct a first min-heap to store in-border interest points, each in-border interest point being an interest point that is within the radius from the query point and having at least one adjacent VoR neighbor that is located farther than the radius from the query point;
construct a second min-heap to store a plurality of out-border interest points,
each out-border interest point being an interest point that is within the radius from the query point and has a least one adjacent VoR neighbor in-border interest point;
construct an initial candidate safe region as a superset of the safe region, by iteratively refining the candidate safe region by searching each top element in said two min-heaps while the min-heaps are not empty, computing intersections of a domain region of the top elements and the candidate safe region, and re-defining the candidate safe region using the intersections, the domain region being the area around said point with the radius of the range query;

return to the user device the result of the range query and the safe region, the user device being configured to check change in a status and, when the change in the status occurs, invalidate the result of the range query and the safe region and then send an update query; and when the computed range query result is empty, construct a conservative region comprising a circular area centered on the query point and having the radius of d−r, d being the distance between the query point and closest interest point and r being the radius of the range query, and replace the safe region with the conservative region in the MRQ result.

12. The method of claim 11, the in-border and the out-border interest points being computed while computing the range query result by using an R-tree range query method on the VoR-tree.

13. The method of claim 11, the in-border and the out-border interest points being computed while computing the range query result by using a modified R-tree range query method on the VoR-tree, the modified R-tree range query on the VoR-tree comprising:

determining whether an interest point is an in-border interest point for all leaf nodes that are covered by the range query, and determining whether each neighbor of each in-border interest point is an out-border interest point; and inserting the in-border interest points and out-border interest points into the first and second min-heaps, respectively.

14. The method of claim 11, the in-border and the out-border interest points being computed while computing the range query result by using a Dynamic Voronoi k nearest neighbor (kNN) algorithm.

15. The method of claim 14, the in-border and the out-border points being computed while computing the range query result by using a modified Dynamic Voronoi k nearest neighbor (kNN) algorithm, the algorithm further comprising:

a termination condition being that an interest point is outside of the range query circle;

determining whether interest points adjacent k nearest neighbors are in-border interest points or out-border interest points; and inserting the in-border interest points and out-border interest points into the first and second min-heaps, respectively.

16. The method of method 12, the computer readable medium comprising instructions that when executed further causes at least one processor to:

construct a candidate safe region comprising the following steps:

retrieve an interest point from the first heap;

compute the domain region of the interest point in the first heap, the domain region being the area around the interest point with the radius of the range query; and make the domain region of the retrieved interest point be the candidate safe region.

17. The method of claim 16, the computer readable medium comprising instructions that when executed further causes at least one processor to:

repeat the following refining steps if either one of the two min-heaps is non-empty:

detect each top interest point whose domain region has not been computed in the first min-heap and the second min-heap;

detect a distance between the top interest point in the first min-heap and the query range circle;

detect a distance between the top interest point in the second min-heap and the query range circle;

compute a domain region of either the top interest point in either the first min-heap or the second min-heap, whose distance to the query range circle is less than the distance of the top interest point and query range circle of the other min-heap;

compute an intersection between the domain region and the candidate safe region; and redefine the candidate safe region as the intersection.

18. A system for performing a computer based mobile range query, the system comprising:

a user device; and a computer readable medium comprising instructions that when executed causes at least one processor to:

receive a mobile range query (MRQ), the mobile range query (MRQ) comprised of a radius of the mobile range query, a query point location, and a request to produce interest points contained within a circular area having the radius and centered at the query point location, and a safe region, the safe region being an area surrounding the query point location such that for each interest point contained in the safe region, the set of interest points within the radius from the query point is the same, the safe region being represented as a list of influential objects or guard objects;

store and index, in computer memory, a plurality of interest points by using a Voronoi Diagram R-tree (VoR-tree);

compute the range query result for the query point, the range query result being the interest points within the radius from the query point;

construct a first min-heap to store a plurality of in-border interest points, each in-border interest point being an interest point that is within the radius from the query point and having at least one adjacent VoR neighbor that is located farther than the radius from the query point;

construct a second min-heap to store a plurality of out-border interest points, each out-border interest point being an interest point that is within the radius from the query point and has a least one adjacent VoR neighbor in-border interest point;

construct an initial candidate safe region as a superset of the safe region, by iteratively refining the safe region by searching each top element in said two min-heaps while the min-heaps are not empty, computing intersections of a domain region of the top elements and the candidate safe region, and re-defining the candidate safe region using the intersections, the domain region being the area around the top element with the radius of the range query;

return to the user device the result of the range query and the safe region, the user device being configured to check change in a status and, when the change in the status occurs, invalidate the result of the range query and the safe region and then send an update query; and when the computed range query result is empty, construct a conservative region comprising a circular area centered on the query point and having the radius of d−r, d being the distance between the query point and closest interest point and r being the radius of the range query, and replace the safe region with the conservative region in the MRQ result.

* * * * *